US006357115B1

(12) United States Patent
Takatsuka et al.

(10) Patent No.: US 6,357,115 B1
(45) Date of Patent: Mar. 19, 2002

(54) METHOD OF MANUFACTURING A FLUID INJECTION APPARATUS

(75) Inventors: Tsutomu Takatsuka; Kazuo Sanada, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/449,612

(22) Filed: Nov. 30, 1999

Related U.S. Application Data

(62) Division of application No. 09/072,554, filed on May 5, 1998, now Pat. No. 6,053,976.

(30) Foreign Application Priority Data

May 8, 1997 (JP) .............................................. 9-118320
Jun. 24, 1997 (JP) .............................................. 9-166953

(51) Int. Cl.$^7$ ......................... B21D 53/76; H04R 17/00; C09J 5/06

(52) U.S. Cl. ................. 29/890.1; 29/25.35; 29/DIG. 1; 156/293; 156/305; 156/321; 347/48; 347/68

(58) Field of Search ............................ 29/25.35, 890.1, 29/611, 830, DIG. 1, 530; 156/293, 305, 321; 347/48, 68, 71, 72; 118/313, 314, 315, 324; 396/604, 626, 627

(56) References Cited

U.S. PATENT DOCUMENTS 5,381,171 A * 1/1995 Hosono et al. ............... 347/72
5,659,346 A * 8/1997 Moynihan et al. ......... 29/890.1

FOREIGN PATENT DOCUMENTS

JP 8-63567 * 3/1996
JP 2000-8016 * 1/2000

* cited by examiner

*Primary Examiner*—Peter Vo
*Assistant Examiner*—Dexter Tugbang
(74) *Attorney, Agent, or Firm*—Sughrue Mion, PLLC

(57) ABSTRACT

A method of manufacturing a fluid injecting apparatus in which an actuator oscillates a nozzle plate disposed in an injecting tank for storing a heated image forming solvent so as to inject an image forming solvent from a plurality of nozzle holes disposed in the nozzle plate. The method includes the steps of: disposing the actuator, which is formed to be smaller than a mounting space formed in the injecting tank, in a recessed manner within the mounting space; next charging an adhesive into a gap between the injecting tank and the actuator which are in a state of being heated to a temperature higher than a temperature of the heated image forming solvent; and hardening the adhesive in a heated state.

3 Claims, 17 Drawing Sheets

METHOD OF MANUFACTURING A FLUID INJECTION APPARATUS

This is a divisional of application Ser. No. 09/072,554 filed May 5, 1998, the disclosure of which is incorporated herein by reference now U.S. Pat. No. 6,053,976.

BACKGROUND OF THE INVENTION

1. Field of the Invention

The present invention relates to a fluid injecting apparatus which can suitably inject a solvent for forming an image to an image recording material such as a light-sensitive material, an image receiving material and the like and a method of manufacturing a fluid injecting apparatus.

2. Description of the Related Art

An image forming apparatus for performing an image recording operation by using two kinds of image recording materials, for example, a light-sensitive material and an image receiving material is known.

A solvent application portion for forming an image having a tank storing a solvent for forming an image which is used for application to the light-sensitive material is disposed within this kind of image forming apparatus, and further a heat developing and transferring portion comprising a heating drum and an endless pressing belt pressed into contact with the outside of the heating drum and rotating with the heating drum is disposed within the image forming apparatus.

A light-sensitive material on which the image is exposed while being held and conveyed within the image forming apparatus is soaked in the tank in which water acting as the image forming solvent is stored at the image forming solvent application portion, and is fed to the heat developing and transferring portion after the water is applied thereon. On the other hand, the image receiving material is fed to the heat developing and transferring portion in the same manner as the light-sensitive material.

In the heat developing and transferring portion, the light-sensitive material after the water is applied thereon is put over the image receiving material and in this state wound around the outer periphery of the heating drum while in close contact thereto. Further, both materials are transferred between the heating drum and the endless pressing belt while being held therebetween, and the image is transferred to the image receiving material at the same time as the light-sensitive material is heat developed, so that a predetermined image is formed (recorded) on the image receiving material.

However, in the case where the light-sensitive material is soaked in the tank in which the water acting as the image forming solvent is stored, once the water comes into contact with the light-sensitive material, it becomes constantly stored in the tank. As a result, bacteria using traces of organic material released from the light-sensitive material as a nutrition source grow in the tank so that the water is made dirty. There is thus a risk of the image forming apparatus itself deteriorating and the image quality dropping.

Accordingly, a method in which the water supply side, such as the tank, is not in contact with the light-sensitive material, and a nozzle plate disposing a plurality of nozzles in a line is vibrated by an actuator so that small water drops are injected from a fluid injecting apparatus corresponding to an atomizer to the light-sensitive material and is applied thereto has been thought of.

Then, when mounting the actuator to the fluid injecting apparatus, the idea of pressing the actuator into the gap within the fluid injecting apparatus so as to be mounted has been thought of.

However, when the fluid injecting apparatus is filled with water, bubbles tend to adhere to the inner wall, and bubbles entering from the nozzles along with injected water drops adhere to the inner wall of the fluid injecting apparatus and remain there. Accordingly, there is a risk of pressure loss through bubbles and deterioration of atomization is generated during the atomizing operation of the fluid injecting apparatus, causing blocking of nozzles.

Because of this, portions free of water appear on the light-sensitive material, so that uniform coating of the light-sensitive material is difficult.

Further, in the case where the structure that the nozzle plate having the nozzle holes is disposed between a pair of lever mechanisms in such a manner as to extend thereover and water drops are injected by displacing the nozzle plate by means of an actuator, a space for freely swinging the lever mechanism is required in the fluid injecting apparatus. As a result of this, unevenness exists on the inner wall surface of the fluid injecting apparatus and bubbles adhere easily to the inner wall surface, so that the deterioration in atomization occurs even more easily during the atomizing operation of the fluid injecting apparatus.

On the other hand, the bubbles can be inhibited from adhering to the inside of the fluid injecting apparatus by making the cross sectional shape of the inner space of the fluid injecting apparatus close to that of a cylindrical and circular tube shape. However, in the case where the inner wall surface which makes the inner space of the fluid injecting apparatus a sealed structure is formed smoothly and made so that the cross sectional shape is similar to a circular tube, it is hard to increase the surface characteristics in places where bonding between the elements constituting the fluid injecting apparatus, for example, a portion connecting the lever mechanism and the fixed wall portion and a portion connecting the lever mechanism and the nozzle plate.

On the other hand, since it is necessary to control the temperature of the fluid injecting apparatus with a heater in order to adjust the water within the fluid injecting apparatus at predetermined temperatures so as to stabilize the image quality, the fluid injecting apparatus itself is thermally expanded in correspondence to the temperature control, so that the sizes of places where the actuator is pressed change such that they are different from the sizes at the time at which the actuator is mounted. As a result, the displacement amount which is transmitted to the nozzle plate from the actuator is changed. This is a problem; the total displacement amount of the nozzle holes which is necessary for injecting the fluid cannot be obtained.

SUMMARY OF THE INVENTION

Taking the above described facts into consideration, the first object of the present invention is to obtain a fluid injecting apparatus which can uniformly apply an image forming solvent to an image recording material and a method of manufacturing a fluid injecting apparatus. Further, the second object of the present invention is to obtain a fluid injecting apparatus which can secure the displacement amount of nozzle holes necessary for injection even when the temperature is controlled and a method of manufacturing a fluid injecting apparatus.

In accordance with the first aspect of the present invention, there is provided a fluid injecting apparatus comprising an injecting tank disposed in opposition to the transfer path of an image recording material and storing an image forming solvent;

a filler filled within the injecting tank and forming an inner wall surface of the injecting tank with a smoothly curved surface;

a nozzle plate disposed in the injecting tank as a part of a wall surface of the injecting tank in opposition to the transfer path of the image recording material, having a plurality of nozzle holes for injecting the image forming solvent and injecting the image forming solvent from the plurality of nozzle holes through movement of the holes back and forth; and a spacer member disposed at the back surface end of the filler and constituting a part of the injecting tank in opposition to the plurality of nozzle holes.

With the above image forming apparatus, the following functions can be achieved.

The inner wall surface of the injecting tank is formed by the smoothly curved surface of the filler and the spacer member disposed at the back surface end of the filler constitutes the part of the injecting tank in opposition to the plurality of nozzle holes. Then, the image forming solvent is stored within the injecting tank and the injecting tank is disposed in opposition to the transfer path of the image recording material.

Further, the nozzle plate in which the plurality of nozzle holes for injecting the image forming solvent are disposed is provided in the injecting tank as a part of the wall surface of the injecting tank in opposition to the transfer path for the image recording material, and the nozzle plate is oscillated back and forth so that the image forming solvent is injected from the plurality of nozzle holes.

Accordingly, it is believed that the bubbles are attached to the wall surface of the injecting tank when the image forming solvent is loaded into the injecting tank, and that the bubbles enter the injecting tank from the nozzle holes together with the injected image forming solvent since the nozzle holes are provided in a part of the wall surface of the injecting tank. However, since the inner wall surface of the injecting tank is formed by the smoothly curved surface of the filler, the bubbles ascend within the injecting tank and leave the injecting tank without being attached to the inner wall surface of the injecting tank and being stored there.

Accordingly, since the pressure loss occurring when bubbles are compressed in the atomizing operation does not take place, deterioration in atomization which results in the image forming solvent not being injected from the nozzle holes does not occur, so that portions where the image forming solvent is not attached are not generated on the image recording material.

Further, at the time of manufacturing the fluid injecting apparatus in accordance with this aspect, it is possible to perform a process for increasing the surface characteristics of the bonding portions between the injecting tank and the nozzle plate from the open portion of the injecting tank to which the spacer member should be entered, before disposing the spacer member in the injecting tank. Further, since the filler is previously adhered to the spacer member before being disposed in the injecting tank and the filler forms the smoothly curved inner wall surface of the injecting tank, the surface characteristics of the inner wall surface of the injecting tank are not affected by the bonding portions between the members.

Accordingly, it is possible to set the cross sectional shape of the inner space of the fluid injecting apparatus to be similar to a circular tube shape while at the same time improving the surface characteristics of the bonding portions between the members constituting the fluid injecting apparatus so as to smoothly form the inner wall surface of the injecting tank.

In accordance with a second aspect of the present invention, there is provided a fluid injecting apparatus comprising an injecting tank disposed in opposition to the transfer path of an image recording material and storing an image forming solvent:

a nozzle plate disposed in the injecting tank as a part of the wall surface of the injecting tank in opposition to the transfer path of the image recording material and having a plurality of nozzle holes for injecting an image forming solvent;

a displacement transmitting member connected to an end portion of the nozzle plate;

a supporting portion disposed between the wall surface of the injecting tank and the displacement transmitting member and supporting the displacement transmitting member in such a manner as to swing freely;

a spacer member constituting a part of the injecting tank in opposition to the plurality of nozzle holes;

an actuator disposed at a position of the displacement transmitting member in correspondence to the plurality of nozzle holes with respect to the supporting portion in a contact manner and swinging the displacement transmitting member around the supporting portion so as to press the image forming solvent within the injecting tank by means of the nozzle plate connected to the displacement transmitting member; and an elastic member filled in a portion between the spacer member and the displacement transmitting member, elastically deformed so as to swing the displacement transmitting member around the supporting portion and filling a space between the space member and the displacement transmitting member so as to make the inner wall surface of the injecting tank a smoothly curved wall surface.

In accordance with the above image forming apparatus, the following function can be achieved.

The injecting tank storing the image forming solvent is disposed in opposition to the transfer path of the image recording material. The nozzle plate having the plurality of nozzle holes for injecting the image forming solvent is disposed in the injecting tank as a part of the wall surface of the injecting tank in opposition to the transfer path of the image recording material, and the spacer member constitutes the part of the injecting tank in opposition to the plurality of nozzle holes.

Further, the displacement transmitting member connected to the end portion of the nozzle plate is supported by the supporting portion in such a manner as to swing freely and the actuator swings the displacement transmitting member around the supporting portion, so that the nozzle plate connected to the displacement transmitting member presses the image forming solvent within the injecting tank.

The elastic material filled in the portion between the spacer member and the displacement transmitting member elastically deforms at a time of oscillation of the displacement transmitting member around the supporting portion so as not to prevent this swinging motion. Then, the elastic member fills the space between the spacer member and the displacement transmitting member so as to make the inner wall surface of the injecting tank the smoothly curved wall surface.

Accordingly, since the displacement transmitting member is swung around the supporting portion together with the operation of the actuator, the portion on the nozzle plate in correspondence to the plurality of nozzle holes is displaced so that the image forming solvent filled in the injecting tank is injected from the plurality of nozzle holes.

Together with this, it is believed that the bubbles enter the injecting tank from the nozzle holes. However, since the inner wall surface of the injecting tank is made of the smoothly curved wall surface by the elastic member, the bubbles rise within the injecting tank and leave the injecting tank without adhering to and accumulating on the inner wall surface of the injecting tank.

Accordingly, since pressure loss along with compression of the bubbles during the atomizing operation does not occur, the deterioration in the atomization due to image forming solvent not leaving the nozzle holes does not occur. This means that the portion where the image forming solvent does not adhere to the image recording material does not appear.

As a result of this, it is possible to apply the image forming solvent to the image recording material uniformly.

Further, when manufacturing the fluid injecting apparatus in accordance with this aspect, as in the same manner as that of the first aspect, it is possible to perform a process for increasing the surface characteristic of the bonding portion between the injecting tank and the nozzle plate from the open portion of the injecting tank to which the spacer member should be entered, before disposing the spacer member in the injecting tank. Further, since the elastic material is previously adhered to the spacer member before being disposed in the injecting tank and the elastic material forms the inner wall surface of the injecting tank to be a smoothly curved surface, the surface characteristics of the inner wall surface of the injecting tank are not affected by the bonding portion between the members.

Accordingly, as in the same manner as that of the first aspect, it is possible to process in such a manner as to set the cross sectional shape of the inner space of the fluid injecting apparatus to be similar to a circular tube shape while increasing the surface characteristic of the portion bonding between the members constituting the fluid injecting apparatus so as to smoothly form the inner wall surface of the injecting tank.

In accordance with a third aspect of the present invention, there is provided a method of manufacturing a fluid injecting apparatus which oscillates a nozzle plate having a plurality of nozzle holes so as to inject an image forming solvent stored within an injecting tank from the plurality of nozzle holes, comprising steps of:

a step of disposing the nozzle plate in the injecting tank; and a step of thereafter disposing a spacer member to which a filler having a smoothly curved surface is adhered in a portion of the injecting tank in opposition to the nozzle holes so that the filler forms an inner wall surface of the injecting tank.

In accordance with the above method of manufacturing a fluid injecting apparatus, the following function can be achieved.

After disposing the nozzle plate having the plurality of nozzle holes in the injecting tank, the spacer member to which the filler is adhered is disposed in the portion of the injecting tank in opposition to the nozzle holes so as to constitute the portion of the injecting tank in opposition to the nozzle holes by the spacer member. Accordingly, the filler having a smoothly curved surface can form the inner wall surface of the injecting tank.

Further, the image forming solvent stored within the injecting tank is injected from the plurality of nozzle holes disposed in the nozzle plate by oscillating the nozzle plate of the fluid injecting apparatus constructed by the above manner.

Accordingly, since the spacer member is disposed in the portion of the injecting tank in opposition to the nozzle holes of the nozzle plate after disposing the nozzle plate in the injecting tank, it is possible to perform a process of increasing the surface characteristic of the connecting portion between the injecting tank and the nozzle plate from the open portion of the injecting tank in which the spacer member should be inserted before disposing the spacer member in the injecting tank.

Further, since the filler can be previously adhered to the spacer member before being disposed in the injecting tank, the filler can be easily formed in such a manner as to have a smoothly curved surface, so that the inner wall surface of the injecting tank can be easily formed by the smoothly curved surface of the filler. Accordingly, even in the case that the injecting tank itself is constituted by a plurality of elements, since the filler forms the inner wall surface of the injecting tank to be a smoothly curved surface by disposing the spacer member in the portion of the injecting tank in opposition to the nozzle holes, the surface characteristic of the inner wall surface of the injecting tank is not affected by the bonding portion between the elements.

Accordingly, it is possible to process the cross sectional shape of the inner space of the fluid injecting apparatus in such a manner as to be similar to a circular tube shape while smoothly forming the inner wall surface of the injecting tank by increasing the surface characteristic of the portion connecting between the elements constituting the fluid injecting apparatus.

In accordance with the above structure, in the fluid injecting apparatus manufactured in accordance with this aspect, since the bubbles are not attached to the inner wall surface of the injecting tank and not stored there, the deterioration of the atomization in which the image forming solvent is not injected from the nozzle hole is not generated, so that the portion to which the image forming solvent is not attached is not generated on the image recording material. As a result, it is possible to evenly apply the image forming solvent to the image recording material.

In accordance with a fourth aspect of the present invention, there is provided a fluid injecting apparatus comprising an injecting tank storing a heated image forming solvent, a nozzle plate disposed in the injecting tank as a part of a wall surface of the injecting tank and having a plurality of nozzle holes for injecting the image forming solvent and an actuator for oscillating the nozzle plate, wherein a mounting space for mounting the actuator is formed in the injecting tank and the actuator is made to have a size smaller than the mounting space, and wherein the actuator is mounted and fit ted to the mounting space by charging an adhesive to a portion between the injecting tank and the actuator which are respectively heated to a temperature higher than a temperature of the heated image forming solvent and hardening.

In accordance with the above fluid injecting apparatus, the following function can be achieved.

The heated image forming solvent is stored within the injecting tank, for example, the injecting tank is disposed in opposition to the transfer path of the image recording material. The nozzle plate having the plurality of nozzle holes for injecting the image forming solvent is disposed in the injecting tank as a part of the wall surface of the injecting tank opposing to the transfer path of the image recording material, and the actuator oscillates the nozzle plate, so that the image forming solvent is injected from the plurality of nozzle holes.

Further, at a time of assembling the fluid injecting apparatus, the actuator formed to be smaller than the mounting space provided in the injecting tank is disposed within the mounting space, and the adhesive is charged into a gap between the injecting tank and the actuator and is hardened at a temperature higher than the temperature of the image forming solvent to be heated, so that the actuator is mounted within the mounting space.

Accordingly, the injecting tank is thermally expanded in accordance that the image forming solvent to be heated is stored, however, since the actuator is mounted within the mounting space by the adhesive hardened at a temperature higher than the temperature of the image forming solvent without being pressed, the displacement amount of the actuator can be securely transmitted through the adhesive even when the injecting tank is thermally expanded, so that a displacement amount for oscillating the nozzle hole necessary for injecting the image forming solvent can be obtained.

In accordance with a fifth aspect of the present invention, there is provided a method of manufacturing a fluid injecting apparatus in which an actuator oscillates a nozzle plate disposed in an injecting tank for storing a heated image forming solvent so as to inject an image forming solvent from a plurality of nozzle holes disposed in the nozzle plate, comprising:

a step of disposing the actuator, which is formed to be smaller than a mounting space formed in the injecting tank in a recessed manner within the mounting space;

a step of next charging an adhesive into a gap between the injecting tank and the actuator which are in a state of being heated to a temperature higher than a temperature of the heated image forming solvent; and a step of hardening the adhesive in a heated state.

In accordance with the above method of manufacturing a fluid injecting apparatus, the following functions can be achieved.

The actuator is mounted to the mounting space by disposing the actuator formed to be smaller than the mounting space formed in the injecting tank in a recessed manner within the mounting space, by charging the adhesive into the gap between the injecting tank and the actuator which are in a state of being heated to a temperature higher than a temperature of the image forming solvent stored within the injecting tank and heated, and by hardening the adhesive in a heated state.

Then, the fluid injecting apparatus assembled in the above manner is operated so as to inject the image forming solvent. However, at this time, the actuator oscillates the nozzle plate disposed in the injecting tank so as to inject the image forming solvent from the plurality of nozzle holes disposed in the nozzle plate.

Accordingly, in the same manner as that of the fourth aspect, the injecting tank is thermally expanded while the image forming solvent to be heated is stored. However, since the actuator is mounted within the mounting space by the adhesive hardened at a temperature higher than the temperature of the image forming solvent without being pressed, the displacement amount of the actuator can be securely transmitted through the adhesive even when the injecting tank is thermally expanded, so that a displacement amount for oscillating the nozzle hole necessary for injecting the image forming solvent can be obtained.

BRIEF DESCRIPTION OF THE DRAWINGS

FIGS. 9A, 9B and 9C are schematic views showing an assembly of the injecting tank in accordance with the first embodiment of the present invention, in which FIG. 9A is a schematic view which shows the state of a single spacer member. FIG. 9B is a schematic view which shows the filling of an elastic member and FIG. 9C is a schematic view which shows the mounting of the spacer member.

FIGS. 15A and 15B are cross sectional views which explain an assembly of the injecting tank in accordance with the third embodiment of the present invention, in which FIG. 15A is a schematic view which shows a state before a piezoelectric element is bonded to a frame and FIG. 15B is a schematic view which shows a state after the piezoelectric element is bonded to the frame.

DETAILED DESCRIPTION OF THE PREFERRED EMBODIMENTS

Figure 1:
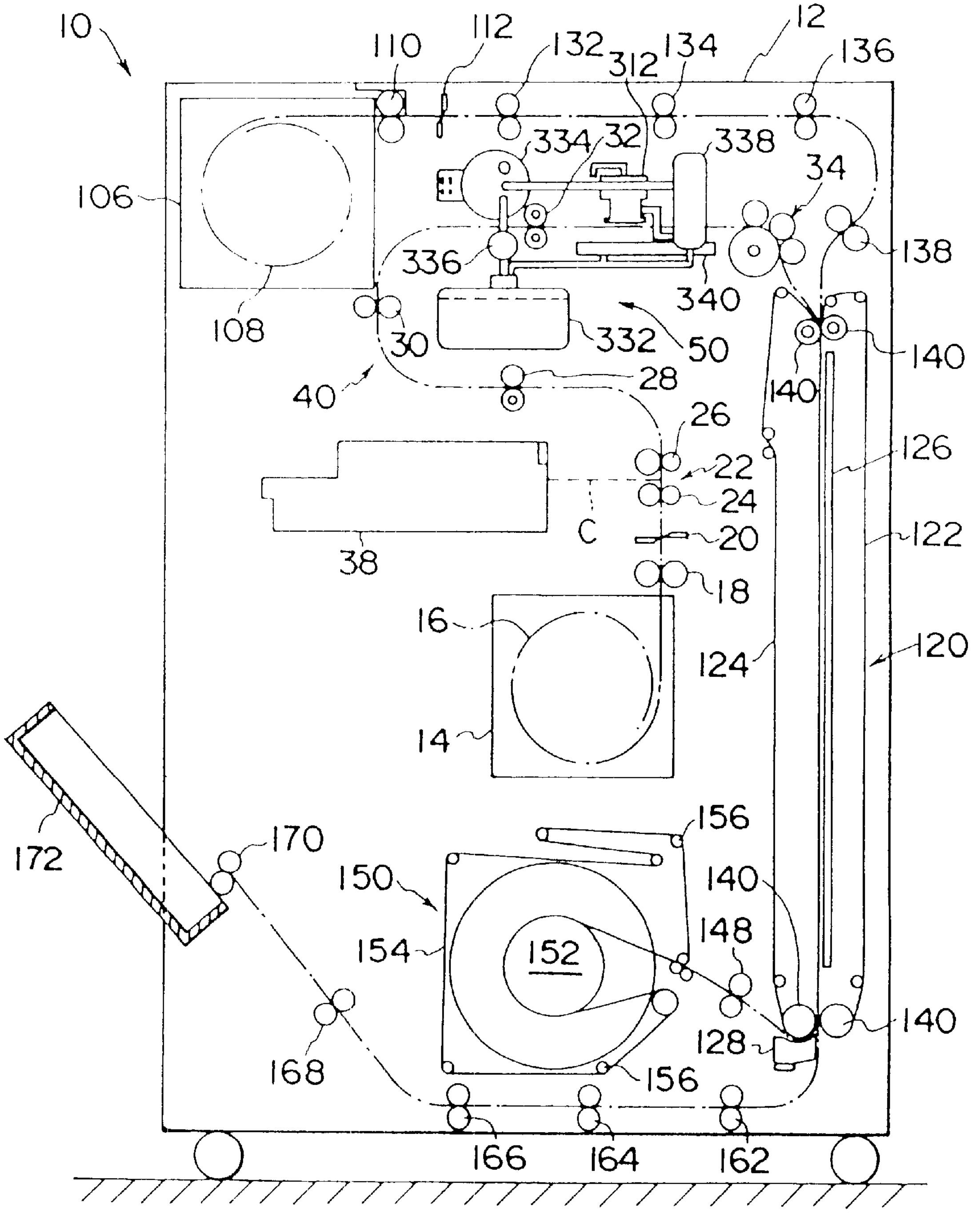
FIG. 1 is a schematic view of the total structure of an image recording apparatus in accordance with a first embodiment of the present invention.

FIG. 1 is a schematic view of the total structure of an image recording apparatus 10 which corresponds to an image forming apparatus in accordance with a first embodiment of the present invention.

A magazine 14 for receiving a light-sensitive material 16 is disposed within a machine casing 12 of the image recording apparatus 10 shown in the drawing, and the light-sensitive material 16 is taken up to the magazine 14 in a roll manner so that a light-sensitive (an exposure) surface of the light-sensitive material 16 taking out from the magazine 14 is directed leftward.

A nip roller 18 and a cutter 20 are disposed near a take-out port of the magazine 14, thereby cutting the light-sensitive material 16 after a predetermined length of light-sensitive material 16 is taken out from the magazine 14. The cutter 20 is, for example, a rotary type cutter comprising a fixed blade and a moving blade, in which the light-sensitive material 16 can be cut by vertically moving the moving blade by means of a rotary cam and the like and engaging with the fixed blade.

A plurality of transfer rollers 24, 26, 28, 30, 32 and 34 are successively disposed downstream of the light-sensitive material 16 in a transfer direction with respect to the cutter 20, and a guide plate (not shown) is disposed between the respective transfer rollers. The light-sensitive material 16 cut at a predetermined length is transferred to an exposing portion 22 provided between the transfer rollers 24 and 26.

An exposing apparatus 38 is provided in the left hand side of the exposing portion 22. Three kinds of LD, lens unit, polygon mirror and mirror unit (these are omitted from the drawing) are disposed in the exposing apparatus 38, and a ray C is fed to the exposing portion 22 from the exposing apparatus 38, and so that the light-sensitive material 16 is exposed.

Further, a U-turn portion 40 for curving the light-sensitive material 16 in a U-shaped manner and for transferring, and a water application portion 50 for applying an image forming solvent are provided above the exposing portion 22. In this case, water is used for the image forming solvent in the present embodiment.

Each of the light-sensitive materials 16 ascending from the magazine 14 and exposed in the exposing portion 22 is held between the transfer rollers 28 and 30 and transferred so as to pass through the transfer path near the above portion of the U-turn portion 40 and so as to be sent to the water application portion 50.

Figure 2:
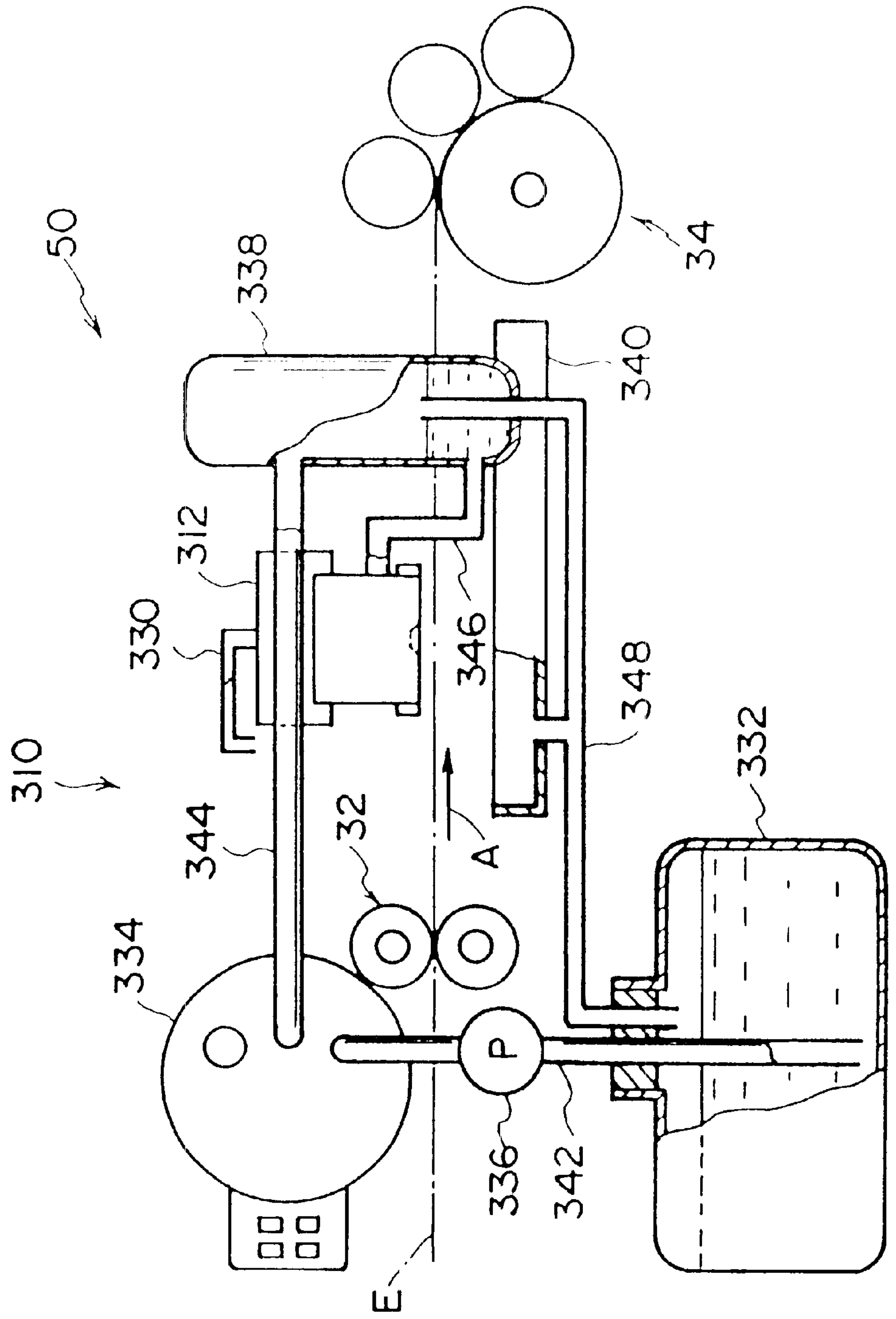
FIG. 2 is a schematic view of a total structure of an application apparatus in accordance with the first embodiment of the present invention.

On the other hand, as shown in FIG. 2, an injecting tank 312 constituting a part of an application apparatus 310 corresponding to a fluid injecting apparatus is disposed at a position opposing a transfer path E of the light-sensitive material 16 in the water application portion 50.

Further, as shown in FIG. 2, a water bottle 332 storing water for supplying the injecting tank 312 is disposed in the left lower portion of the injecting tank 312, and a filter 334 for filtering the water is disposed in the upper portion of the water bottle 332. Further, a water feeding pipe 342 having a pump 336 disposed in the middle connects the water bottle 332 with the filter 334.

Further, a sub tank 338 storing the water fed from the water bottle 332 is disposed in the right portion of the injecting tank 312 and a water feeding pipe 344 is extended from the filter 334 to the sub tank 338.

Accordingly, when the pump 336 is operated, the water is fed from the water bottle 332 to the filter 334 and the filtered water passing through the filter 334 is fed to the sub tank 338 so that the water is temporarily stored in the sub tank 338.

Still further, a water feeding pipe 346 connecting the sub tank 338 and the side portion of one end of the injecting tank 312 is disposed therebetween, so that the water fed through the filter 334, the sub tank 338, the water feeding pipe 346 and the like from the water bottle 332 by the pump 336 is filled within the injecting tank 312.

A tray 340 connected to the water bottle 332 by a circulating pipe 348 is disposed in the lower portion of the injecting tank 312, so that water spilt from the injecting tank 312 is collected by the tray 340 and is returned to the water bottle 332 through the circulating pipe 348. Further, the circulating pipe 348 is connected to the sub tank 338 in a state of projecting and extending to within the sub tank 338, thereby returning more water than is necessary from where it is stored within the sub tank 338 to the water bottle 332.

Figure 4:
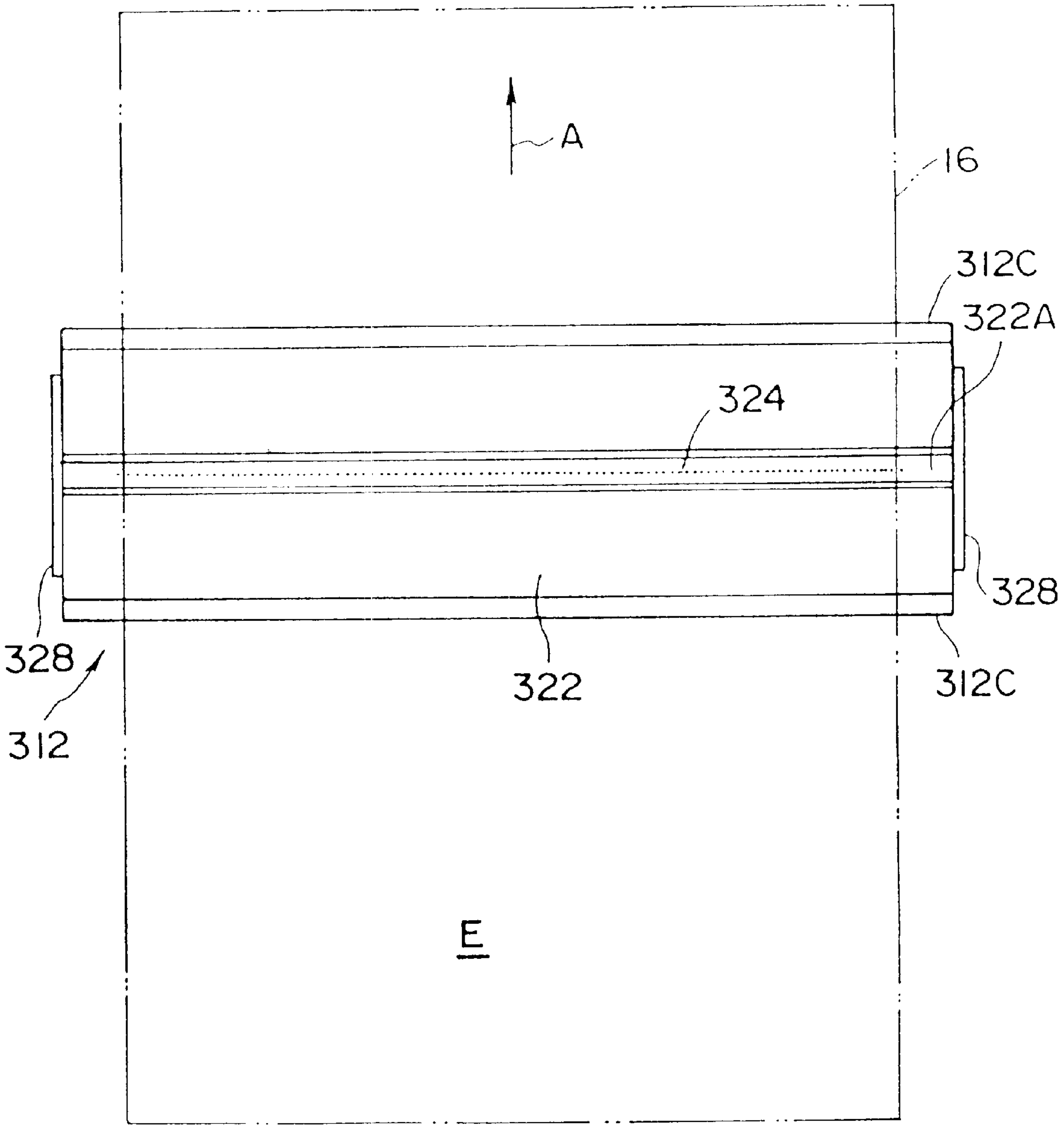
FIG. 4 is a bottom elevational view showing the state in which a light-sensitive material is transferred under the injecting tank in accordance with the first embodiment of the present invention.
Figure 6:
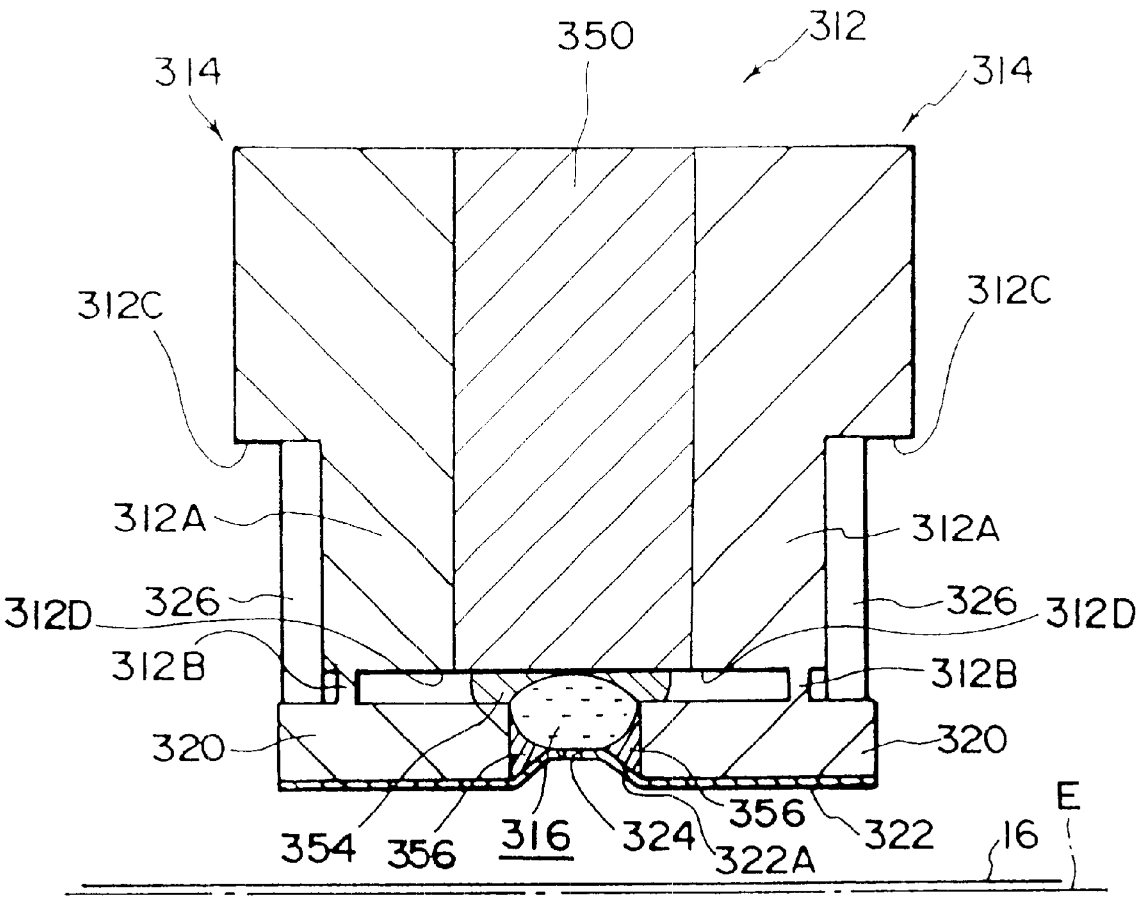
FIG. 6 is a cross sectional view which shows the injecting tank in accordance with the first embodiment of the present invention.

Further, as shown in FIGS. 4 and 6, a nozzle plate 322 formed by a plate member (for example, having a thickness is equal to or less than 60 μm) having a thin plate shape which has a rectangular shape and is capable of being elastically deformed is provided in a portion in opposition to the transfer path E of the light-sensitive material 16 corresponding to a bottom wall surface corresponding to a part of the wall surface of the injecting tank 312.

Figure 3:
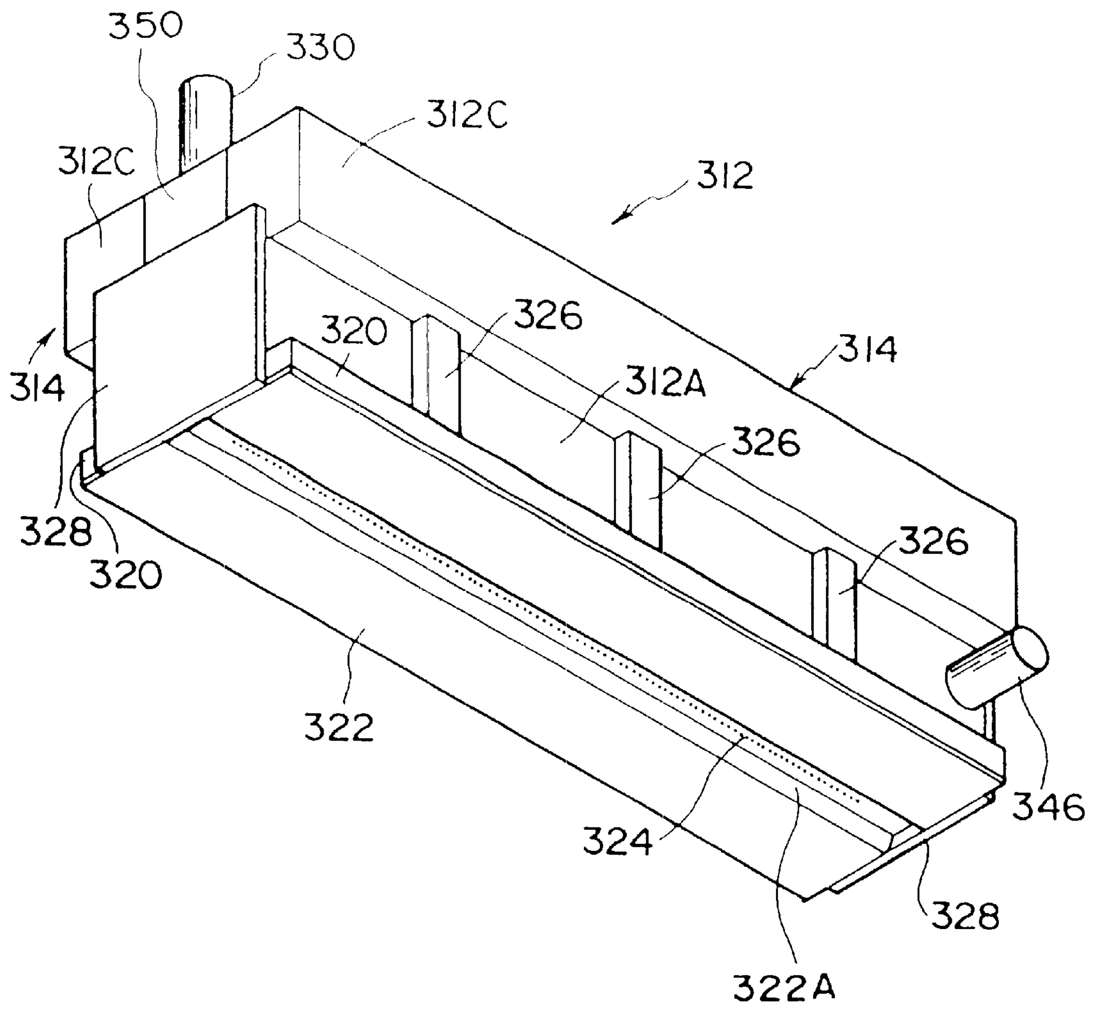
FIG. 3 is an enlarged perspective view of an injecting tank in accordance with the first embodiment of the present invention.
Figure 5:
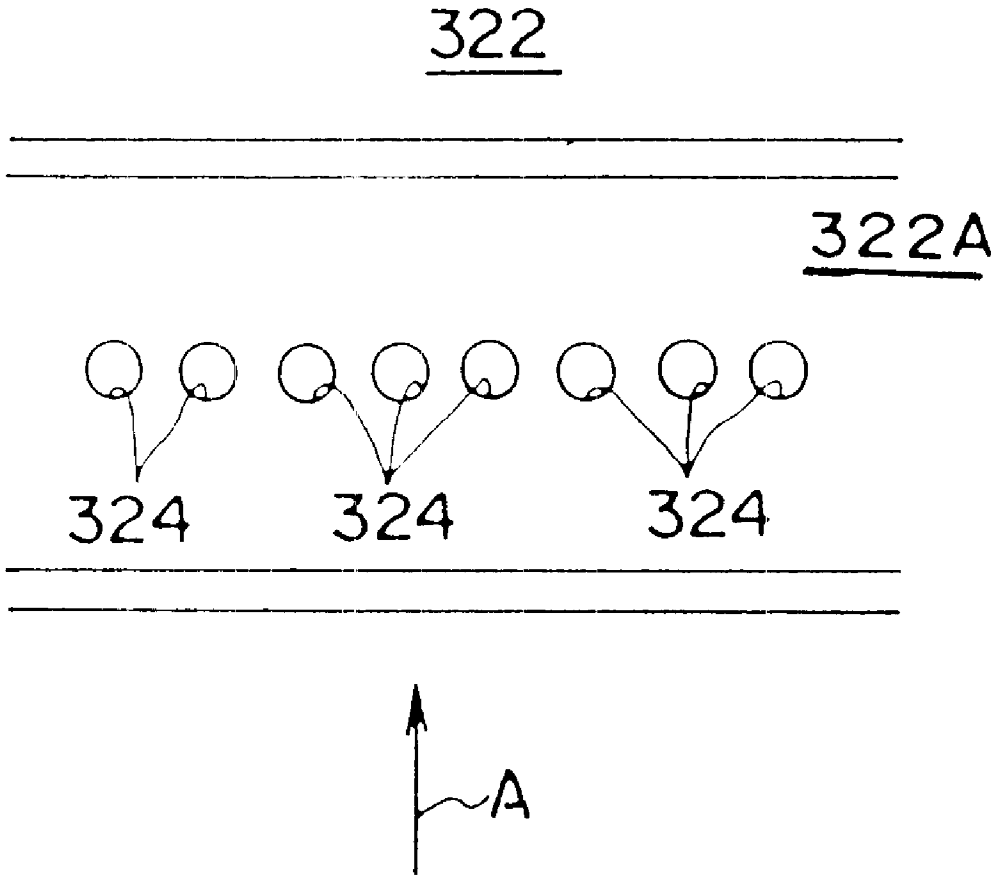
FIG. 5 is an enlarged schematic view of the main portion in FIG. 4.

Then, as shown in FIGS. 3 to 5, a plurality of nozzle holes 324 (having a diameter, for example of from 10 μm to 200 μm) linearly disposed along a direction crossing the transfer direction A for the light-sensitive material 16 at regular intervals are disposed in the nozzle plate 322 right across the width direction of the light-sensitive material 16. Accordingly, the water filled into the injecting tank 312 by all of the nozzle holes 324 can be injected to the side of the light-sensitive material 16.

Still further, a groove portion 322A extending along a direction in which a plurality of nozzle holes 324 are linearly disposed is formed in a curved manner so as to increase rigidity of the nozzle plate 322 along the longitudinal direction corresponding to the direction that the plurality of nozzle holes 324 are disposed in the nozzle plate 322.

On the other hand, as shown in FIGS. 2 and 3, an exhaust tube 330 extends from the upper portion of the injecting tank 312 corresponding to the side opposing the portion to which the water feeding pipe 346 is connected, and the exhaust tube 330 allows the inner portion of the injecting tank 312 to communicate with the outer portion thereof. Further, a valve (not shown) for opening and closing the exhaust tube 330 is disposed at the middle of the exhaust tube 330, and the portion within the injecting tank 312 can communicate with the outer air or be separated from the outer air by opening and closing the valve.

Both end portions of the nozzle plate 322 corresponding to end portions of the nozzle plate 322 positioned in a direction perpendicular to the longitudinal direction of the nozzle row formed by the linearly disposed plurality of nozzle holes 324 are respectively bonded to a pair of lever plates 320 corresponding to a displacement transfer member by an adhesive or the like, as shown in FIG. 6. Then, the nozzle plate 322 and the pair of lever plates 320 are connected to each other by means of the adhesive. The pair of lever plates 320 are respectively fixed to a pair of tank main body constituting members 312A through a supporting portion 312B extending along the direction in which the plurality of nozzle holes 324 respectively formed in the lower wall portion of the pair of tank main body constituting members 312A of the injecting tank 312 and having narrow width are linearly disposed.

On the other hand, the opposing surfaces of the pair of tank main body constituting members 312A are respectively made smooth surfaces without any unevenness, and a spacer member 350 having a rectangular parallelepiped shape is held between the opposing surfaces of the pair of tank main body constituting members 312A. Accordingly, the opposing surfaces and the surface forming the spacer member 350 are brought into contact with each other with no gap, thereby forming the upper end portion of the injecting tank 312. Further, the step portion 312C projecting outside the injecting tank 312 by one level is provided in each of the pair of tank main body constituting members 312A, so that the injecting tank 312 is formed such that the upper portion thereof projects from the middle portion in the vertical direction.

A plurality of piezoelectric elements 326 (in the present embodiment, three on each side) corresponding to an actuator are bonded and disposed to the lower side surface of the step portion 312C. The outer end portion of the lever plate 320 corresponding to the portion of the lever plate 320 positioned opposite the plurality of nozzle holes 324 with respect to the supporting portion 312B is bonded to the lower surface of the piezoelectric element 326, so that the piezoelectric element 326 and the lever plate 320 are connected to each other.

Accordingly, the lever mechanism is constituted by the piezoelectric element 326, the lever plate 320 and the supporting portion 312B, and an oscillating groove 312D for making it possible to oscillate the lever plate 320 is provided in each of the portions between the pair of lever plates 320, the pair of tank main body constituting members 312A and the spacer member 350.

In this case, the piezoelectric element 326 is formed by, for example, layered piezoelectric ceramics (for example, PZT), so that the axial displacement of the piezoelectric element 326 is enlarged. The piezoelectric element 326 is connected to a power source (not shown) in which timing of voltage application is controlled by a controller. Further, the valve for opening and closing the exhaust tube 330 mentioned above is also connected to the controller so that the controller controls the opening and closing operation of the valve.

On the other hand, each of the lever plates 320, the tank main body constituting member 312A and the supporting portion 312B forms a part of a frame 314 integrally formed. As shown in FIG. 6, a pair of frames 314 are overlapped with holding the spacer member 350 therebetween and screwed by a bolt (not shown) so that a pair of lever plates 320, a pair of tank main body constituting members 312A and a pair of the supporting portion 312B form an outer frame of the injecting tank 312 so that they are respectively disposed in an opposing manner to each other. In this case, the frame 314 and the spacer member 350 are made of an extruded material formed by an extrusion molding of aluminum.

Figure 8:
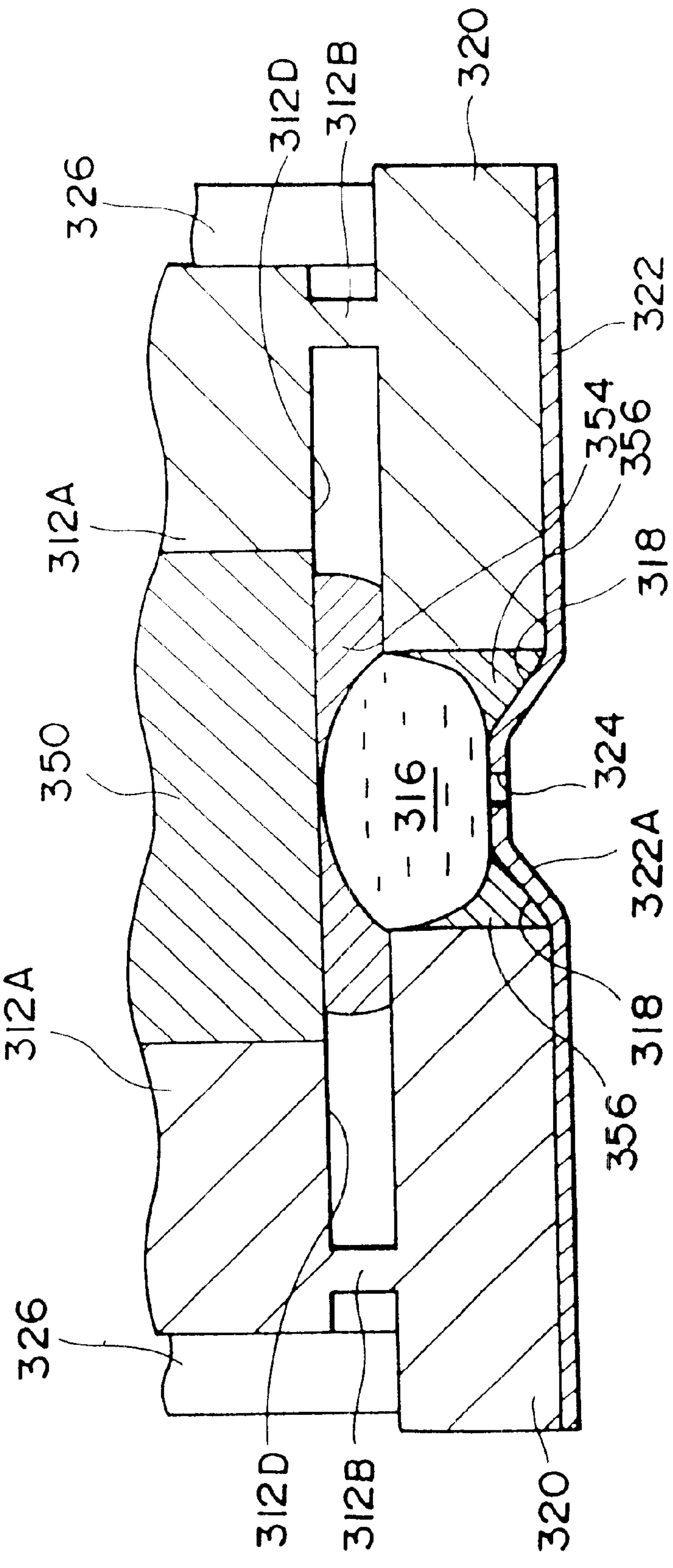
FIG. 8 is an enlarged cross sectional view which shows the main portion of the injecting tank in accordance with the first embodiment of the present invention.

Further, as shown in FIG. 8 which shows a main portion of the injecting tank 312 in an enlarged manner, a space substantially formed in a rectangular cross sectional shape and defined by a bottom surface of the spacer member 350, a front end surface of a pair of lever plates 320 and an upper surface of the nozzle plate 322 is formed between front end portions of a pair of lever plates 320 within the injecting tank 312, and a solvent storing space 316 for storing water is disposed within the space.

Accordingly, an elastic member 354 (for example, a silicon adhesive) constituted by a silicon rubber is filled within the space in such a manner as to describe a smooth and free curve with no unevenness so as to form an inner wall surface of the solvent storing space 316. The spacer member 350 is disposed at the back surface end of the elastic member 354 Further, the portions of the elastic member 354 are respectively filled within the groove portion 312D for oscillation, whereby a sealing performance around the groove portion 312D for oscillation can be secured.

As mentioned above, when the outer end of the lever plate 320 is moved by the piezoelectric element 326, the lever plate 320 is oscillated around the support portion 312B, and the inner end of the lever plate 320 is going to move to a direction opposite to the direction of the motion. At this time, the elastic member 354 is often compressed and pulled in correspondence to the oscillation of the lever plate 320, however, can not prevent the lever plate 320 from oscillating due to the elastic deformation.

Further, a pair of recess portions 318 are formed between an upward projecting portion and a front end surface of a pair of lever plates 320 in FIG. 8 by means of the groove portion 322A formed on the nozzle plate 322.

An elastic member 356 (for example, a silicon adhesive) constituted by a silicon rubber is filled in the recess portion 318 in such a manner as to slightly overflow from the recess portion 318, and an inner wall surface of the solvent storing space 316 for storing water by the smoothly curved surface is formed by the elastic members 354 and 356.

In this case, in place of the elastic member 356, a surface adhesive (for example, a thermoplastic sheet adhesive) for bonding between the lever plate 320 and the nozzle plate 322 with no gap may be employed, and the surface adhesive may be filled in such a manner as to slightly overflow from the recess portion 318, so that the inner wall surface of the solvent storing space 316 for storing water by the smoothly curved surface may be formed by the surface adhesive and the elastic member 354.

As mentioned above, the filler can be constituted by the elastically deformable elastic members 354 and 356, and the elastic material and the plastic material are filled within the groove portion 312D for oscillation and the solvent storing space 316. Then, since the cross sectional shape shown in FIG. 6 of the solvent storing space 316 for storing water of the injecting tank 312 becomes similar to the smoothly curved circular tube shape, the bubbles do not attach to the inner portion of the injecting tank 312 so easily.

On the other hand, as mentioned above, a uniform and large amplitude of the nozzle plate 322 can be obtained along the direction in which a plurality of nozzle holes 324 are linearly disposed by small number of the piezoelectric elements 326. Accordingly, the amplitude can be made such that amplitude distribution along the width direction of the light-sensitive material 16 is uniform and the water pressure of the peripheral portion of each of the nozzle holes 324 reaches a pressure capable of atomizing. As a result, the water can be injected and atomized all around the width direction of the light-sensitive material 16 from the plurality of nozzle holes 324 in a substantially equal manner.

Further, as shown in FIGS. 3 and 4, a thin seal plate 328 is disposed in a portion defined by the right and left ends of the nozzle plate 322 corresponding to the end portion of the nozzle plate 322 positioned in the longitudinal direction of the nozzle row formed by the nozzle holes 324, the end portion of the spacer member 350 and the end portions of the pair of frames 314 in a state of being bonded to the end portion of the spacer member 350 and the pair of frames 314.

Further, the inner portion of the seal plate 328 is filled with an elastic adhesive, for example, comprising a silicon rubber adhesive for the purpose of filling the gap between the right and left ends of the nozzle plate 322, the end portion of the spacer member 350 and the end portions of the pair of frame 314, and the seal plate 328 so as to prevent the water from leaking between these elements. Accordingly, the gap of the injecting tank 312 can be sealed by the elastic adhesive without preventing the right and left ends of the nozzle plate 322 from moving. In this case, the right and left ends of the injecting tank 312 may be sealed by only the elastic adhesive without using the thin seal plate 328.

Figure 7:
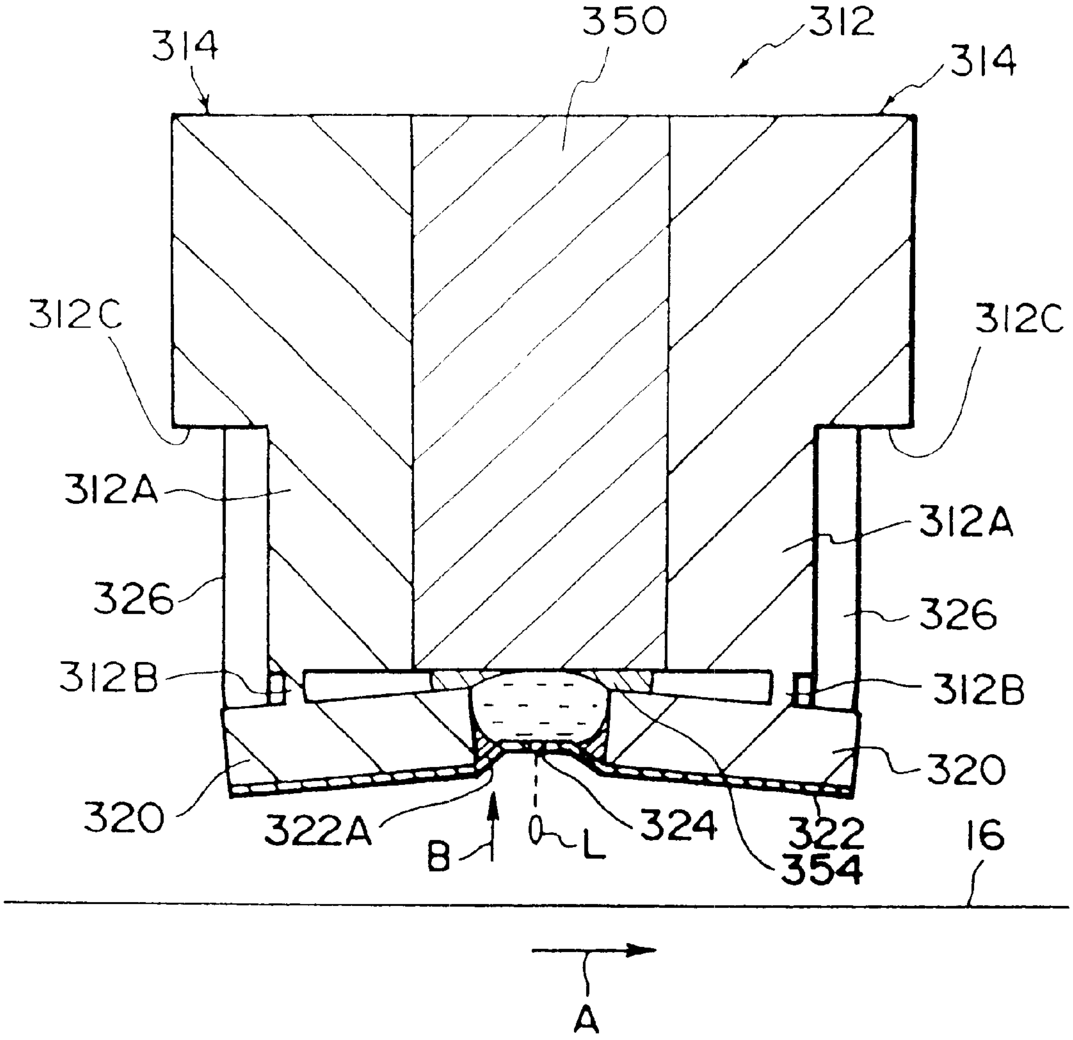
FIG. 7 is a cross sectional view showing the state in which water is injected from the injecting tank in accordance with the first embodiment of the present invention.

As mentioned above, when the piezoelectric element 326 is in contact with the power source, as shown in FIG. 7, the piezoelectric component 326 extends so as to rotate the lever plate 320 around the supporting portion 312B. In accordance with this, the piezoelectric element 326 deforms and displaces the nozzle plate 322 in such a manner as to raise the center portion of the nozzle plate 322 along an arrow B direction through the lever plate 320. Then, together with this deformation of the nozzle plate 322, the water pressure within the injecting tank 312 is increased so that water drops L corresponding to a small amount of water are respectively injected from the nozzle holes 324 in a unit in a linear manner.

Further, the piezoelectric element 326 repeatedly makes contact so as to repeatedly extend the piezoelectric element 326, so that the water drops L can be continuously injected from the nozzle holes 324.

Next, the structure of the injecting tank 312 in accordance with the embodiment will be described below.

At first, a pair of symmetrical frames 314 and cubic spacer members 350 are respectively formed by extrusion of aluminum material.

Figure 9A:
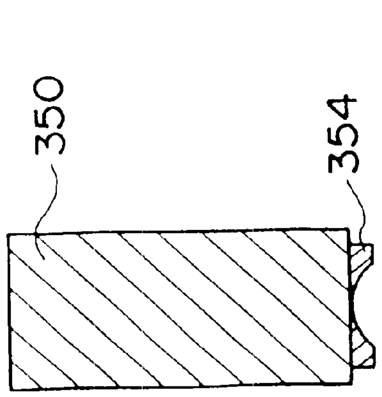

Next, the elastic member 354 is applied to the surface of single spacer members 350, thereby forming a layer of the elastic member 354 as shown in FIG. 9A. Accordingly, the upper end of the inner wall surface of the solvent storing space 316 formed in such a manner as to describe the smooth and free curve with no unevenness is formed in the lower portion of the spacer member 350 by an initial fluidization of the elastic member 354.

Figure 9B:
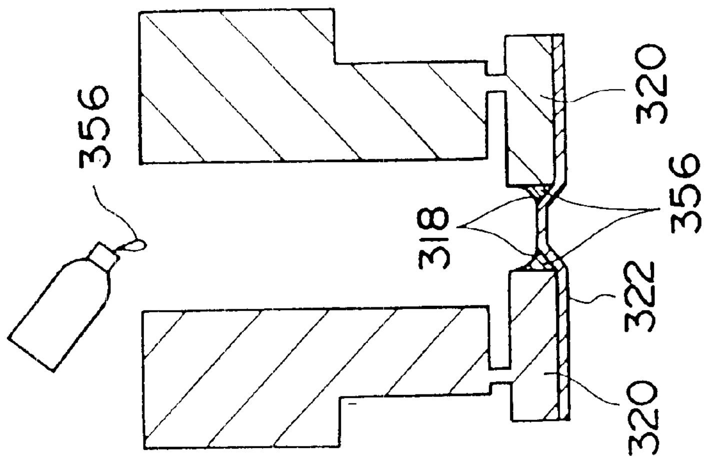

Thereafter, the nozzle plate 322 is bonded to each of the lever plates 320 of a pair of frames 314 as shown in FIG. 9B, so that the nozzle plate 322 is disposed in the injecting tank 312. Then, as shown in FIG. 9B, in a state that the bonding surface after the member is fastened is open to the outer portion, the elastic member 356 is filled within the recess portion 318 in such a manner as to overflow from the recess portion 318. Accordingly, the lower end of the inner wall surface of the solvent storing space 316 formed in such a manner as to describe the smooth and free curve with no unevenness is formed by the initial fluidization of the elastic member 356 initially having fluidization while the elastic member 356 charges the recess portion 318.

Accordingly, the portion between the lever mechanism and the nozzle plate 322 which requires a drive characteristic and a rigidity can be bonded by an adhesive in correspondence to the purpose. The elastic member 356 corresponding to the independent adhesive thereof is filled within the recess portion 318 after bonding them by the adhesive, thereby making the inner wall surface of the injecting tank 312 smooth, so that both mechanical strength and flatness can be achieved.

Figure 9C:
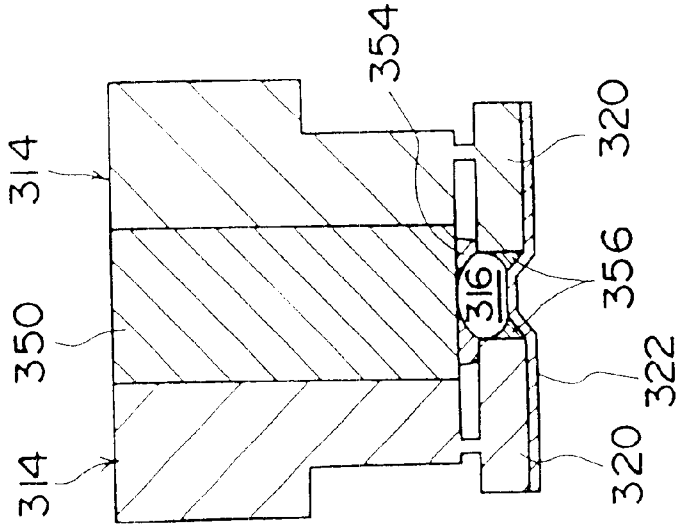

Next, by fastening a pair of frames 314 by means of bolts (not shown) while holding the spacer member 350 therebetween, as shown in FIG. 9C, the pair of frames are bonded, so that the spacer member 350 fixing the elastic member 354 is disposed in the portion of the injecting tank 312 opposing the nozzle holes 324. The elastic member 354 having the smoothly curved surface forms the inner wall surface of the injecting tank 312.

Then, the structure of the injecting tank 312 is completed by finally mounting the sealing plate 328, the piezoelectric element 326 and the like.

As mentioned above, since it is structured such as to dispose the spacer member 350 in the portion of the injecting tank 312 opposing the nozzle hole 324 after disposing the nozzle plate 322 in the injecting tank 312, it is possible to perform a process for improving the surface characteristics of the bonding portion between the injecting tank 312 and the nozzle plate 322. That is, a process for filling the elastic member 356 within the recess portion 318 and the like, from the open portion of the injecting tank 312 in which the spacer member 350 should be inserted, before disposing the spacer member 350 in the injecting tank 312.

Further, since the elastic member 354 can be previously adhered to the spacer member 350 before being disposed in the injecting tank 312, the elastic member 354 can be easily formed with a smoothly curved surface, so that the inner wall surface of the injecting tank 312 can be easily formed by the smoothly curved surface of the elastic member 354. Accordingly, in the case that the injecting tank 312 itself is constituted by a plurality of members, since the spacer member 350 is disposed in the portion of the injecting tank 312 opposing the nozzle hole 324 so that the elastic member 354 forms the inner wall surface of the injecting tank 312 to become the smoothly curved surface, the surface characteristics of the inner wall surface of the injecting tank 312 are not affected by the bonding portion between the elements.

Accordingly, it is possible to process in such a manner as to make the cross sectional shape of the inner space of the application apparatus 310 similar to a circular tube shape while smoothly forming the inner wall surface of the injecting tank 312 by improving the surface characteristics of the portion bonding between the members constituting the application apparatus 310.

On the other hand, as shown in FIG. 1, an image receiving material magazine 106 for receiving an image receiving material 108 is disposed in the left upper end portion within the machine casing 12. A coloring matter fixing material including a mordant is applied to the image forming surface of the image receiving material 108, and the image receiving material 108 is taken up to the image receiving material magazine 106 in a roll manner so that the image forming surface of the image receiving material 108 is taken out from the image receiving material magazine 106 facing a downward direction.

A nip roller 110 is disposed near an image receiving material taking out port of the image receiving material magazine 106, so that the nip roller 110 nips the image receiving material 108 so as to take out the image receiving material 108 from the image receiving material magazine 106 and to remove the nip operation.

A cutter 112 is disposed in the side of the nip roller 110. The cutter 112 is a rotary type cutter comprising, for example, a fixed blade and a moving blade formed in the same manner as the cutter 20 for the light-sensitive material mentioned above. Accordingly, the moving blade of the cutter 20 is vertically moved by means of the rotary cam and the like so as to be meshed with the fixed blade so that the image receiving material 108 taken out from the image receiving material magazine 106 can be cut to a length shorter than the light-sensitive material 16.

Transfer rollers 132, 134, 136 and 138 and a guide plate (not shown) are disposed in the side of the cutter 112, so that the image receiving material 108 cut to a predetermined length can be transferred to a heat developing and transferring portion 120.

Figure 10:
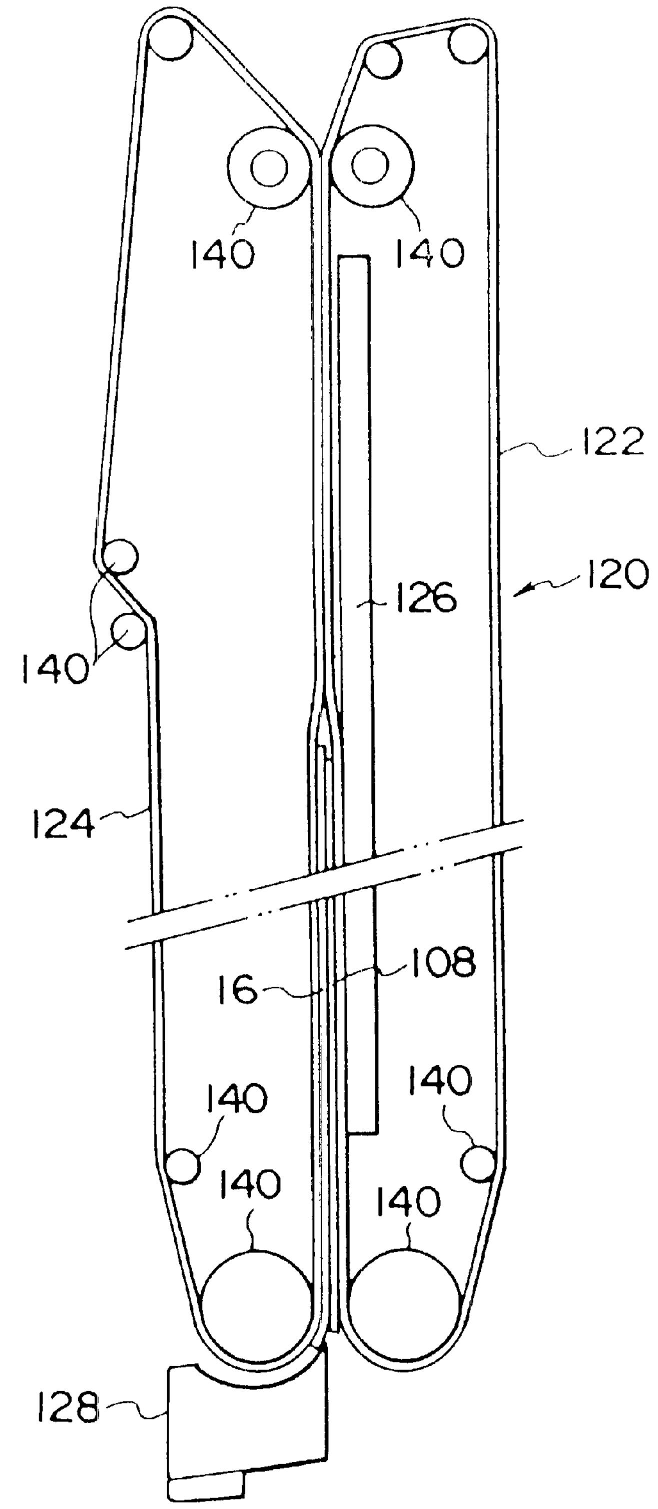
FIG. 10 is an enlarged schematic view which shows a heat developing and transferring portion in accordance with the first embodiment of the present invention.

As shown in FIGS. 1 and 10, the heat developing and transferring portion 120 are respectively wound around a plurality of winding rollers 140, and each of them has a pair of endless belts 122 and 124 having a vertical direction for a longitudinal direction and formed as a loop. Accordingly, when any of the winding rollers 140 is driven and rotated, the pair of endless belts 122 and 124 wound around the winding rollers 140 are respectively rotated.

A heating plate 126 having a vertical direction for a longitudinal direction and formed as a plane plate shape is disposed within the loop of the right endless belt 122 in the drawing among the pair of endless belts 122 and 124 so as to oppose the inner peripheral portion in the left side of the endless belt 122. A linear heater (not shown) is disposed within the heating plate 126, and the temperature on the surface of the heating plate 126 can be increased by this heater to a predetermined temperature.

Accordingly, the light-sensitive material 16 is fed to the portion between the pair of endless belts 122 and 124 of the heat developing and transferring portion 120 by means of the last transfer roller 34 in the transfer path. Further, the image receiving material 108 is transferred in a synchronous manner with the transfer of the light-sensitive material 16, and when the light-sensitive material 16 goes a predetermined length forward, the light-sensitive material 16 is fed to the portion between the pair of endless belts 122 and 124 of the heat developing and transferring portion 120 by means of the last transfer roller 138 in the transfer path, thereby being overlapped with the light-sensitive material 16.

In this case, since the image receiving material 108 is smaller in both the width direction and the longitudinal direction than the light-sensitive material 16, they are overlapped so that all four sides of the peripheral portions of the light-sensitive material 16 project from the peripheral portions of the image receiving material 108.

As mentioned above, the light-sensitive material 16 and the image receiving material 108 overlapped by the pair of endless belts 122 and 124 are held between the pair of endless belts 122 and 124 and transferred by the pair of endless belts 122 and 124 in a state of being overlapped. Further, at a time when the overlapped light-sensitive material 16 and the image receiving material 108 are completely received in the portion between the pair of endless belts 122 and 124, the pair of endless belts 122 and 124 temporarily stop rotating and the held light-sensitive material 16 and the image receiving material 108 are heated by the heating plate 126. The light-sensitive material 16 is heated through the endless belt 122 and the heating plate 126 while being held, transferred and stopped. The light-sensitive material discharges a movable coloring matter when thus heated. At the same time, the coloring matter is transferred to the coloring matter fixing layer of the image receiving material 108 so that the image can be obtained on the image receiving material 108.

Further, a break away hook 128 is disposed on the downstream side in the material supply direction with respect to the pair of endless belts 122 and 124. Accordingly, of the light-sensitive material 16 and the image receiving material 108 held and transferred between the pair of endless belts 122 and 124 the break away hook 128 is engaged with only the front end portion of the light-sensitive material 16, thereby breaking the front end portion of the light-sensitive material 16 projecting from the portion between the pair of endless belts 122 and 124 away from the image receiving material 108.

A light-sensitive material discharging roller 148 is disposed on the left portion of the break away hook 128 and is structured in such a manner as to transfer the light-sensitive material 16 moved leftward while being guided by the break away hook 128 further to a waste light-sensitive material receiving portion 150 side.

The waste light-sensitive material receiving portion 150 has a drum 152 around which the light-sensitive material 16 is wound and a belt 154 which is partially wound around the drum 152. The belt 154 is wound around a plurality of rollers 156, and the belt 154 is driven by the rotation of these rollers 156 so that the drum 152 is accordingly rotated.

Accordingly, in a state where the belt 154 is driven by the rotation of the rollers 156, when the light-sensitive material 16 is fed, it is structured such that the light-sensitive material 16 can be collected around the drum 152.

On the other hand, in FIG. 1, image receiving material discharging rollers 162, 164, 166, 168 and 170 are successively disposed in such a manner as to transfer the image receiving material 108 leftward from the lower portion of the pair of endless belts 122 and 124. Accordingly, the image receiving material 108 discharged from the pair of endless belts 122 and 124 is transferred by these image receiving material discharging rollers 162, 164, 166, 168 and 170 so as to be discharged to a tray 172.

Next, an operation of the present embodiment will be described.

In the image recording apparatus 10 having the above structure, the nip roller 18 is operated after the light-sensitive material magazine 14 is set, so that the light-sensitive material 16 is taken out by the nip roller 18. When the light-sensitive material 16 is taken out at a predetermined length, the cutter 20 is operated, so that the light-sensitive material 16 is cut at a predetermined length and is transferred to the developing portion 22 in a state of directing the light-sensitive surface (the developing surface) leftward. Then, while the light-sensitive material 16 is being passes through the developing portion 22, the developing apparatus 38 is operated, so that the image is scanned and developed on the light-sensitive material 16 is positioned at the developing portion 22.

After completion of the development, the developed light-sensitive material 16 is fed to the water application portion 50. In the water application portion 50, the transferred light-sensitive material 16 is fed to the injecting tank 312 by the operation of the transfer roller 32, as shown in FIG. 4.

Then, the water is attached to the light-sensitive material 16 transferred along the transfer path E by the injection of the injecting tank 312. Motion and operation at this time will be described below.

Then injecting tank 312 storing water is disposed in the above portion of the transfer path E opposite the transfer path E of the light-sensitive material 16. Further, the nozzle plate 322 in which a plurality of nozzle holes 324 for injecting water are linearly disposed is disposed in the injecting tank 312 as a bottom wall surface of the injecting tank 312 opposing the transfer path E of the light-sensitive material 16, so that the spacer member 350 constitutes a portion of the injecting tank 312 opposing a plurality of nozzle holes 324.

A pair of elongated lever plates 320 are respectively connected to both end portions of the nozzle plate 322 in a direction perpendicular to the direction in which a plurality of nozzle holes 324 are linearly disposed, and the pair of lever plates 320 are respectively supported to swing to a pair of support portions 312B respectively extending along the direction in which a plurality of nozzle holes 324 are linearly disposed.

Further, before the water is injected by the injecting tank 312, at first, the valve of the exhaust tube 330 is closed by the controller. At the time of atomizing and injecting the water in this state, voltage is applied to the piezoelectric element 326 by making contact by means of the power source controlled by the controller, so that all the piezoelectric elements 326 are distorted so as to stretch at the same time.

When the plurality of piezoelectric elements 326 are extended and compressed at the same time, the portion of the nozzle plate 322 disposed in around the nozzle holes 324 positioned in a state of being held between the pair of lever plates 320 is oscillated toward the light-sensitive material 16 on the transfer path E (in this case, moving in the direction shown by the arrow B in FIG. 7) together with the respective swing motion of the pair of lever plates 320 around the supporting portion 312B, so that the nozzle plate 322 pressurizes the water within the solvent storing space 316 of the injecting tank 312.

As mentioned above, in accordance with the motion of the piezoelectric element 326, the water filled in the solvent storing space 316 of the injecting tank 312 is injected from the plurality of nozzle holes 324. As a result of this, the water filled in the injecting tank 312 is injected and atomized from the nozzle holes 324 as shown in FIG. 7 so as to be attached to the light-sensitive material 16 while being transferred.

At this time, the elastic member 354 filled between the lower wall surface of the spacer member 350 and the pair of lever plates 320 is elastically deformed at a time of oscillation of the pair of lever plates 320 around the support portion 312B so as not to prevent oscillation. Then, the elastic member 354 charges the space between the wall surface of the spacer member 350 and the pair of lever plates 320, so that the elastic members 354 and 356 make the inner wall surface of the solvent storing space 316 the smoothly curved wall surface.

In accordance with the above, sometimes bubbles enter the inner portion of the injecting tank 312 from the nozzle holes 324 together with injecting water. However, since the inner wall surface of the solvent storing space 316 in the injecting tank 312 is a smoothly curved wall surface by virtue of the elastic members 354 and 356, the bubbles are not attached to and do not stay in the inner wall surface of the solvent storing space 316. Then, the bubbles ascend within the injecting tank 312 and are discharged out of the injecting tank 312 from the discharge tube 330.

Accordingly, since pressure loss due to bubbles being compressed at the time of the atomizing operation of the injecting tank 312 is not generated, the deterioration of atomization resulting in the water not being injected from the nozzle holes 324 is not generated, so portions where water is not attached are not generated on the light-sensitive material 16.

As a result of this, water can be evenly applied to the upper surface of the light-sensitive material 16 even with an injecting tank 312 which is not in contact with the light-sensitive material 16.

Further, at a time of manufacturing the application apparatus 310 in accordance with this embodiment, as mentioned above, before the spacer member 350 is disposed in the injecting tank 312, it is possible to perform a process for increasing the surface characteristics of the bonding portion between the injecting tank 312 and the nozzle plate 322 from the open portion of the injecting tank 312 in which the spacer member 350 is inserted. Further, since the elastic member 354 is previously adhered to the spacer member 350 before being set to the injecting tank 312 and the elastic member 354 forms the inner wall surface of the injecting tank 312 in such a manner as to become the smoothly curved surface, the surface characteristic of the inner wall surface in the injecting tank 312 is not affected by the bonding portion of these elements.

Accordingly, as mentioned above, it is possible to perform a process for making the cross sectional shape of the inner space of the application apparatus 310 similar to a circular tube shape while increasing the surface characteristics of the portion for bonding the elements constituting the application apparatus 310 so as to smoothly form the inner wall surface of the injecting tank 312.

Further, in accordance with the operation of the piezoelectric element 326, since the lever plate 320 is swung around the supporting portion 312B extending along the direction to which the plurality of nozzle holes 324 are linearly disposed, all of the portions in which the plurality of nozzle holes 324 of the nozzle plate 322 are provided are uniformly displaced.

Accordingly, the nozzle holes 324 can be stably displaced along the longitudinal direction of the nozzle row formed by the linearly disposed plurality of nozzle holes 324 as a unit at the same displacing amount, so that the water filled in the injecting tank 312 is uniformly injected from the plurality of nozzle holes 324. Accordingly, portions where water is not attached are even less likely to arise on the light-sensitive material 16.

On the other hand, since the injecting tank 312 has the nozzle holes 324 and water is injected from the nozzle holes 324, when compared with the application apparatus which is structured such as to soak the light-sensitive material and the like in a tank storing water and to apply water, it is possible to apply water with only a little amount of water. It is also possible to dry the light-sensitive material 16 in a short time.

Further, since the injecting tank 312 has the plurality of nozzle holes 324 disposed all across the width direction of the light-sensitive material 16 and the water is injected from the nozzle holes 324 at the same time through a single deformation by means of the piezoelectric element 326, the water can be widely applied all across the width direction of the light-sensitive material 16 in a single injection. Accordingly, it is not necessary to scan the nozzle plate 322 on a two-dimensional plane, and large area application can be performed in a short time, so that the application time can be reduced.

Still further, as well as the transfer speed of the light-sensitive material 16, water can be applied to all of the surface of the light-sensitive material 16 by injecting water from the nozzle holes 324 repeatedly at will. When the water is injected from the nozzle holes 324 of the nozzle plate 322, the water within the injecting tank 312 is reduced gradually. However, since the sub tank 338 has a function of supplying water and keeping the water level within the injecting tank 312 constant, water is supplied from the sub tank 338 so that the water pressure within the injecting tank 312 during the atomization can be kept constant, thereby securing continuous water injection.

Thereafter, the light-sensitive material 16 to which the water is applied in the water application portion 50 for the image forming solvent is fed to the portion between the pair of endless belts 122 and 124 of the heat developing and transferring portion 120 by the transfer roller 34.

On the other hand, while the light-sensitive material is scanned and developed 16, the image receiving material 108 is also taken out from the image receiving material magazine 106 by the nip roller 110 and transferred. When the image receiving material 108 is taken out at a predetermined length, the cutter 112 is operated so that the image receiving material 108 is cut into predetermined lengths.

After the cutter 112 is employed, the cut image receiving material 108 is transferred by the transfer rollers 132, 134, 136 and 138 while being guided by the guide plate. Once the front end portion of the image receiving material 108 is held between the transfer rollers 138, the image receiving material 108 is on standby right in front of the heat developing and transferring portion 120.

Then, because the light-sensitive material 16 is fed into the portion between the pair of endless belts 122 and 124 by the transfer roller 34 as mentioned above, the transfer of the image receiving material 108 is restarted, so that the image receiving material 108 is fed to the portion between the pair of endless belts 122 and 124 as a unit with the light-sensitive material 16.

As a result of this, since the light-sensitive material 16 and the image receiving material 108 overlap and the light-sensitive material 16 and the image receiving material 108 are held and transferred while being heated by the heating plate 126, the image is thermally developed and transferred so as to be formed on the image receiving material 108.

Further, when these are discharged from the pair of endless belts 122 and 124, the break away hook 128 is engaged with the front end portion of the light-sensitive material 16 which is transferred at a predetermined length prior to the image receiving material 108, so as to break away the front end portion of the light-sensitive material 16 from the image receiving material 108. The light-sensitive material 16 is further transferred by the light-sensitive material discharging roller 148 and is collected within the waste light-sensitive material receiving portion 150. At this time, since the light-sensitive material 16 dries quickly, it is not necessary to further provide any form of heater for drying the light-sensitive material 16.

On the other hand, the image receiving material 108 separated from the light-sensitive material 16 is transferred by the image receiving material discharging rollers 162, 164, 166, 168 and 170 so as to be discharged to the tray 172.

Then, in the case that a recording operation of a plurality of images is performed, the above processes are successively and continuously performed.

As mentioned above, the image receiving material 108 held between the pair of endless belts 122 and 124 and thermally developed and transferred so that a predetermined image is formed (recorded) is held between the plurality of image receiving material discharging rollers 162, 164, 166, 168 and 170 and transferred so as to be taken out of the apparatus after being discharged from the pair of endless belts 122 and 124.

Next, an enlarged cross sectional view of the injecting tank 312 in accordance with a second embodiment of the present invention will be shown in FIG. 1 and described below. In this case, the same reference numerals are attached to the same elements described in the first embodiment and the explanation thereof will be omitted.

Figure 11:
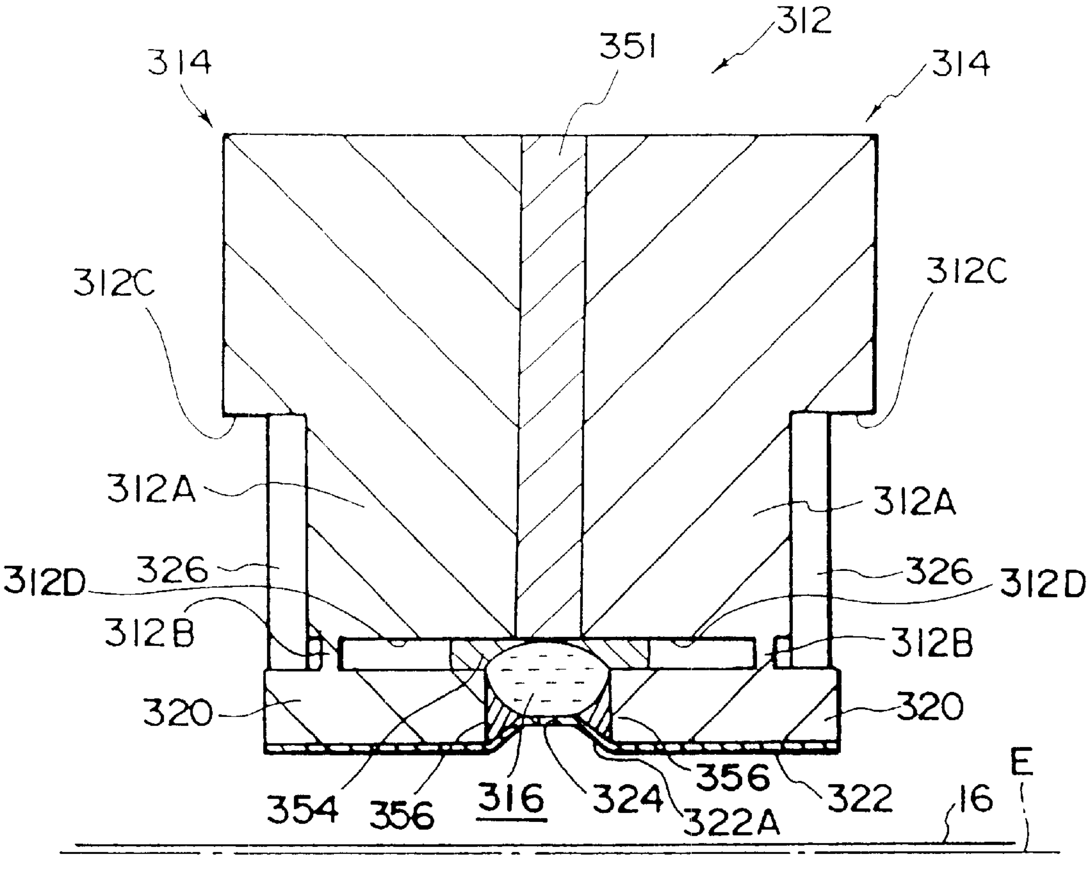
FIG. 11 is a cross sectional view of an injecting tank in accordance with the second embodiment of the present invention.

As shown in FIG. 11, as a spacer member 351 of the injecting tank 312 in accordance with this embodiment, a structure formed in such a manner as to have a width narrower than the spacer member 350 in accordance with the first embodiment is employed.

Further, at the time of assembling the injecting tank 312 in accordance with this embodiment, in place of applying the elastic member 354 on one surface of the spacer member 350 in a state of a single spacer member 350, immediately before closing the upper portion of the injecting tank 312 by the spacer member 351, the inner wall surface of the injecting tank 312 is formed by applying the elastic member 354 corresponding to an adhesive having a low viscosity from the open upper portion of the injecting tank 312.

Accordingly, also in this embodiment, the smoothness of the inner wall surface of the solvent storing space 316 can be secured in the same manner as that of the first embodiment.

Next, the injecting tank 312 in accordance with a third embodiment of the present invention will be shown in FIGS. 12 to 16 and described below. The same reference numerals are attached to the same elements as those described in the first embodiment, and the overlapping description will be omitted.

Figure 12:
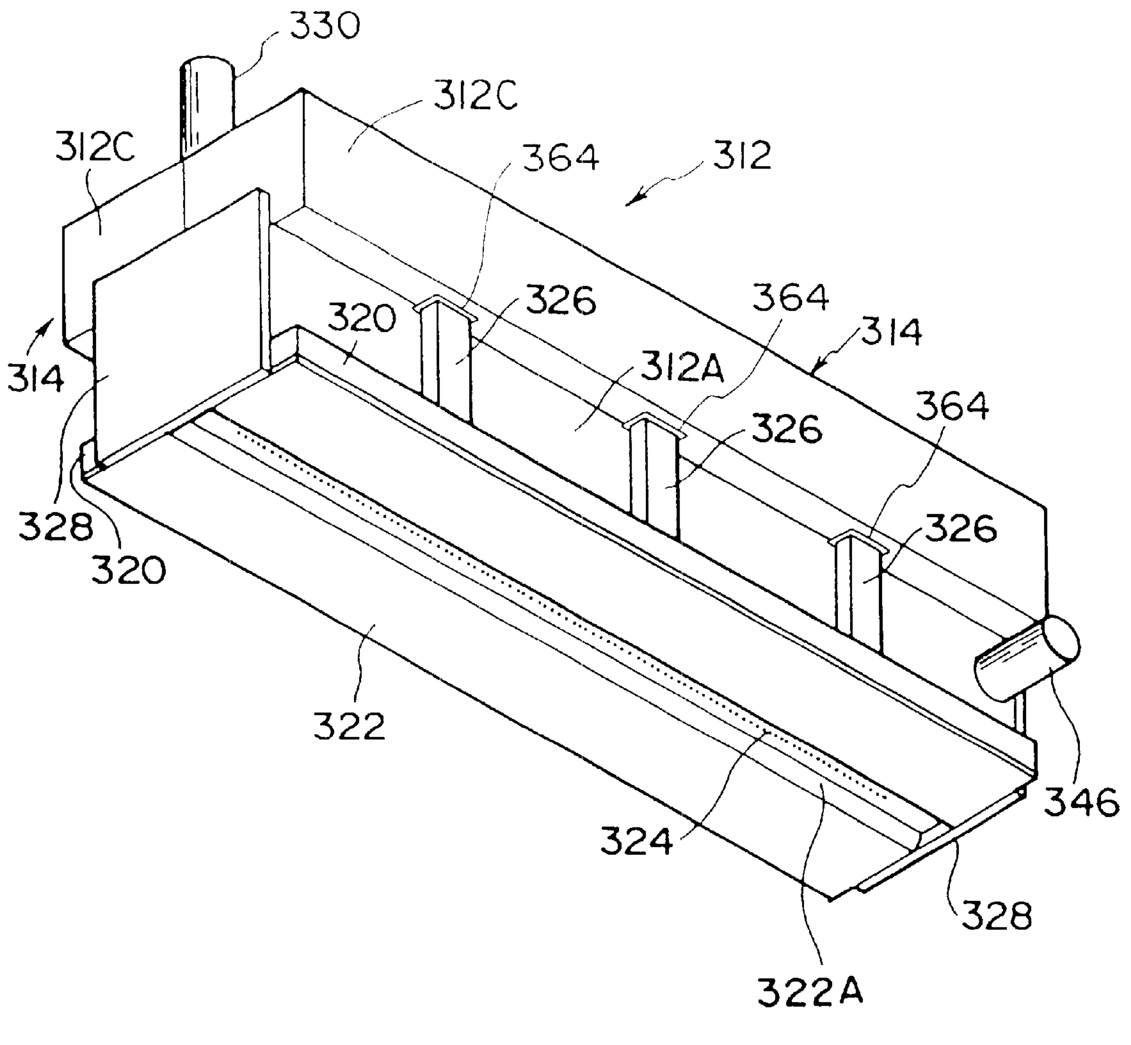
FIG. 12 is an enlarged perspective view of an injecting tank in accordance with a third embodiment of the present invention.
Figure 13:
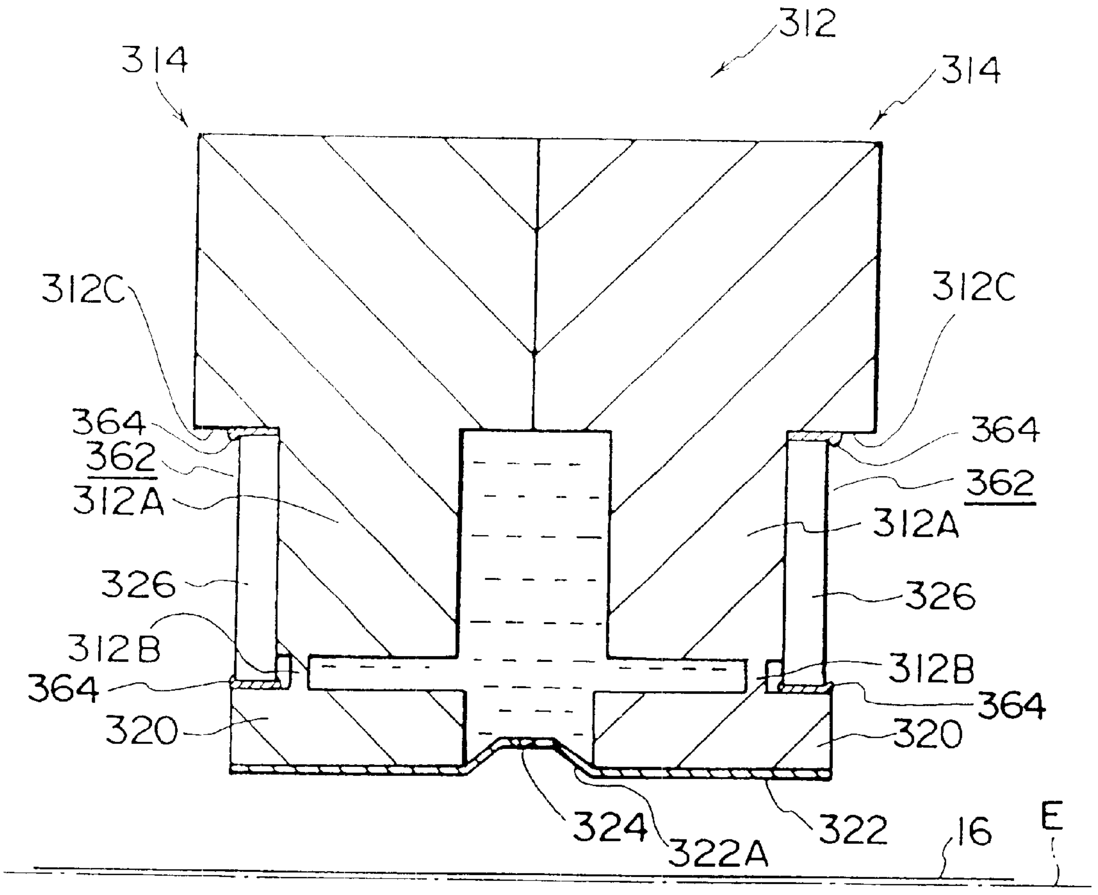
FIG. 13 is a cross sectional view of the injecting tank in accordance with the third embodiment of the present invention.

As shown in FIGS. 12 and 13, a pair of tank main body constituting members 312A forms a main portion of the injecting tank 312 in accordance with this embodiment, each of the opposing surfaces close to the upper portion of the pair of tank body constituting members 312A is formed as a smooth surface without unevenness, and these opposing surfaces are brought into contact with each other with no gap so as to form the upper side portion of the injecting tank 312. Further, the step portion 312C projecting one level out of the injecting tank 312 is provided in each of the pair of tank body constituting members 312A, so that the injecting tank 312 has a shape in which the upper portion projects above the middle portion in the vertical direction. Accordingly, a mounting space 362 is provided in each of the portions between the step portion 312C and the lever plate 320 in a recessed manner.

The plurality of piezoelectric elements 326 (three on each side in this embodiment) corresponding to the actuator formed in such a manner as to be smaller than the mounting space 362 are bonded and disposed within the mounting space 362.

Accordingly, an adhesive 364 (for example, an epoxy resin adhesive) is charged into the gap between the lower side surface of the step portion 312C and the upper surface of the piezoelectric element 326, so that they are bonded. Further, the adhesive 364 is charged into the gap between the outer end portion of the lever plate 320 corresponding to the portion of the lever plate 320 positioned while holding the supporting portion 312B with respect to the plurality of nozzle holes 324 and the lower surface of the piezoelectric element 326, so that they are bonded. In accordance with this, the piezoelectric element 326 is mounted within the mounting space 362.

Accordingly, the lever mechanism is constituted by these piezoelectric elements 326, the lever plate 320 and the supporting portion 312B, so that when the outer end portion of the lever plate 320 is moved by the piezoelectric element 326, the lever plate 320 is swung around the supporting portion 312B, so that the inner end portion of the lever plate 320 moves in a direction opposing the motion.

On the other hand, each of the lever plates 320, the tank body constituting member 312A and the supporting portion 312B forms a part of the integrally formed frame 314. As shown in FIG. 13, the pair of frames 314 are overlapped and screwed by a bolt (not shown), so as to form the outer frame of the injecting tank 312 in a state that the pair of lever plates 320, the pair of tank body constituting members 312A and the pair of supporting portions 312B are respectively disposed in such a manner as to be opposed to each other. In this case, the frame 314 is formed by an extruded material through aluminum extrusion molding.

Next, a mounting of the piezoelectric element 326 into the mounting space 362 at the time of assembling the injecting tank 312 will be described.

At first, the piezoelectric element 326 is formed to be smaller than the mounting space 362 formed in the frame 314 of the injecting tank 312 is a recessed manner, so that the piezoelectric element 326 is disposed within the mounding space 362.

Figure 15A:
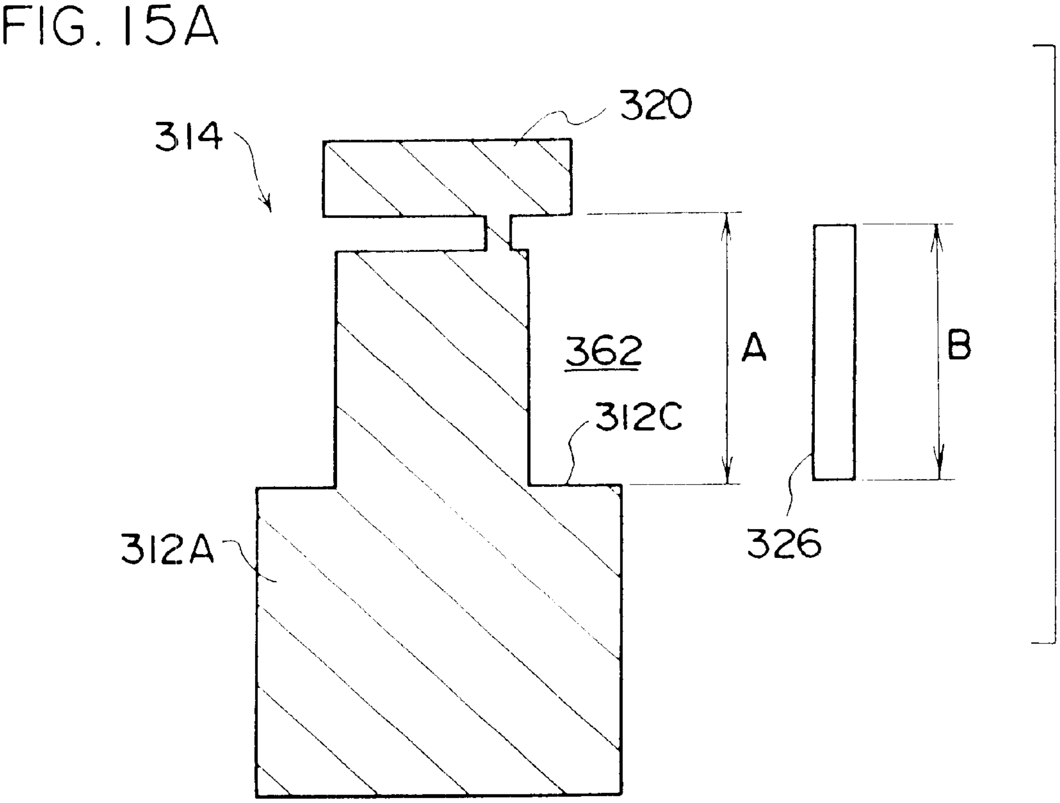

Accordingly, as shown in FIG. 15A, at room temperature (for example, 20° C.), an A size corresponding to a width size of the mounting space 362 is set to be 9.05 to 9.07 mm and a B size corresponding to a height size of the piezoelectric element 326 is set to be 9.00 to 9.02 mm, thereby making the size of the gap between the wall surface of the frame 314 constituting the mounting space 362 and the piezoelectric element 326 a size from 0.07 mm at the maximum to 0.03 mm at the minimum.

Then, the injecting tank 312 and the piezoelectric element 326 are heated to a temperature (for example, 50° C.) higher than the temperature of the water stored within the injecting tank 312 (for example, 40° C.). The adhesive 364 is charged into the gap between the injecting tank 312 in a heated state and the piezoelectric element 326.

Accordingly, since the heat expansion coefficient of the frame 314 material is $23\times10^{-6}/°$ C. and the heat expansion coefficient of the piezoelectric element 326 is $4.5\times10^{-6}/°$ C., they are heated and kept at a temperature of 50° C., thereby expanding the gap between the wall surface of the frame 314 forming the mounting space 362 and the piezoelectric element 326. Then, as shown in Table 1, the size of the gap between the wall surface of the frame 314 forming the mounting space 362 and the piezoelectric element 326 is set to be from 0.12 mm at the maximum to 0.08 mm at the minimum.

TABLE 1

DIMENSIONAL RELATION BETWEEN MOUNTING SPACE AND PIEZOELECTRIC ELEMENT

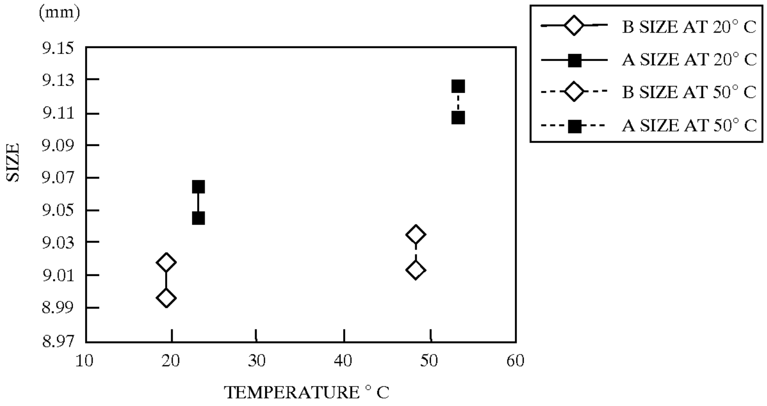

Further, it is structured such that the adhesive 364 is charged into each of the gaps between the wall surface of the frame 314 forming the mounting space 362 and the piezoelectric element 326. In this case, an epoxy resin adhesive can be used as the adhesive 364.

Figure 15B:
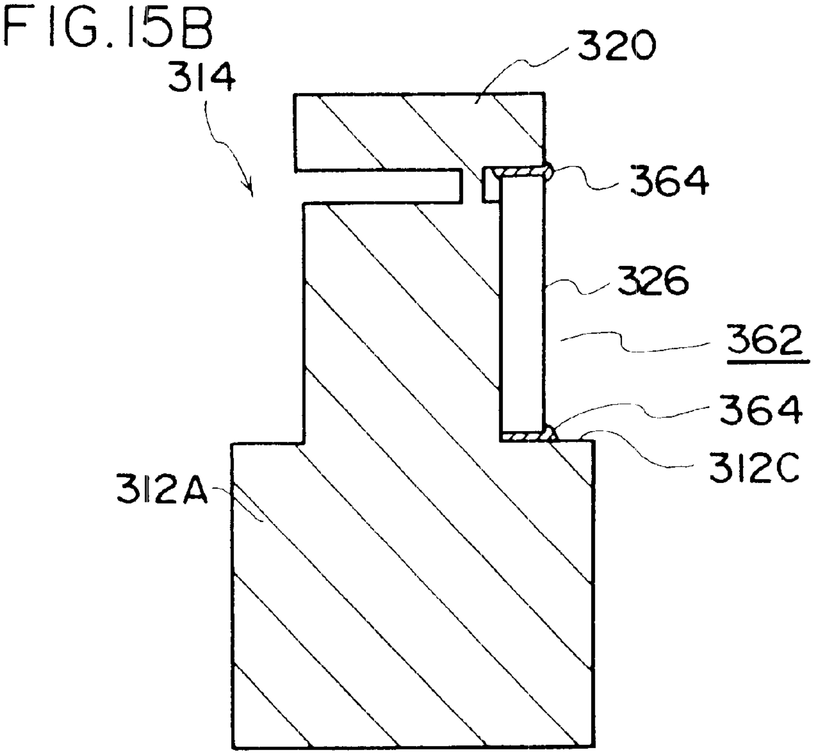

Thereafter, the adhesive 364 is kept at a regulated temperature (for example, 50° C.) at the time of charging the adhesive 364, (for example, for about 2 hours). This is to harden the adhesive 364, so that the piezoelectric element 326 can be mounted within the mounting space 362 as shown in FIG. 15B.

Further, an assembly between a pair of frames 314, a bonding of the lever plate 320 to the nozzle plate 322 and the like are performed separately from the above, so that the injecting tank 312 is completed.

On the other hand, since the piezoelectric element 326 is disposed in the injecting tank 312 as mentioned above, the uniform and large amplitude of the nozzle plate 322 can be obtained along the direction in which the plurality of nozzle holes 324 are linearly disposed by the piezoelectric elements 326. Accordingly, the amplitude can be made such that the amplitude distribution along the width direction of the light-sensitive material 16 is uniform and the water pressure of the peripheral portion of each of the nozzle holes 324 reaches the pressure in which the atomization can be performed. As a result of this, it is possible to inject and atomize the water all around the width direction of the light-sensitive material 16 from the plurality of nozzle holes 324 in a substantially uniform manner.

Further, at this time, in order to stabilize the quality of an image, a heater (not shown) for maintaining the temperature of the injected water at an increased state is disposed in the injecting tank 312.

Further, as shown in FIG. 12, a thin sealing plate 328 is disposed in a portion defined by right and left ends of the nozzle plate 322 corresponding to the end portion of the nozzle plate 322 positioned in a longitudinal direction of the nozzle row formed by the nozzle hole 324 and the end portion of a pair of frames 314 in a state of being bonded to the pair of frame 314.

Still further, in the inner side of the sealing plate 328, an elastic adhesive, for example, a silicon rubber adhesive is filled in order to charge the gap between the right and left ends of the nozzle plate 322, the end portion of a pair of frame 314 and the sealing plate 328 so as to prevent the water from leaking from the portion therebetween. Accordingly, the gap of the injecting tank 312 can be sealed by the elastic adhesive without preventing the right and left ends of the nozzle plate 322 from moving. In this case, it may be possible to seal the right and left ends of the injecting tank 312 only by the elastic adhesive without using the thin sealing plate 328.

Next, an operation of the present invention will be described below.

The image recording apparatus 10 in accordance with this embodiment operates in the same manner as that of the first embodiment, and the water is attached to the light-sensitive material 16 transferred along the transfer path E by the injection from the injecting tank 312 in the same manner as that of the first embodiment. However, there is a difference as mentioned below with the first embodiment.

Accordingly, at the time of injecting the water from the injecting tank 312, at first the pump 336 is operated so as to fill the water fed by the water bottle 332 through the filter 334, the sub tank 338, the feeding pipe 346 and the like within the injecting tank 312. As mentioned above, after the water is filled within the injecting tank 312 so as to be stored, the valve of the exhaust tube 330 is made in a closed state by the controller.

Further, while water is filled and stored in the injecting tank 312, the heater for heating the water is operated, thereby keeping the temperature of the water at 40° C. Accordingly, the injecting tank 312 itself is heated together with the water, so that the injecting tank 312 is thermally expanded. However, since the piezoelectric element 326 is not pressed and is mounted within the mounting space 362 of the injecting tank 312 by the adhesive 364 hardened by the water temperature in a state of high temperature of 50° C., the displacement amount of the piezoelectric element 326 can be securely transmitted through the adhesive 364 even when the injecting tank 312 is thermally expanded.

Figure 16:
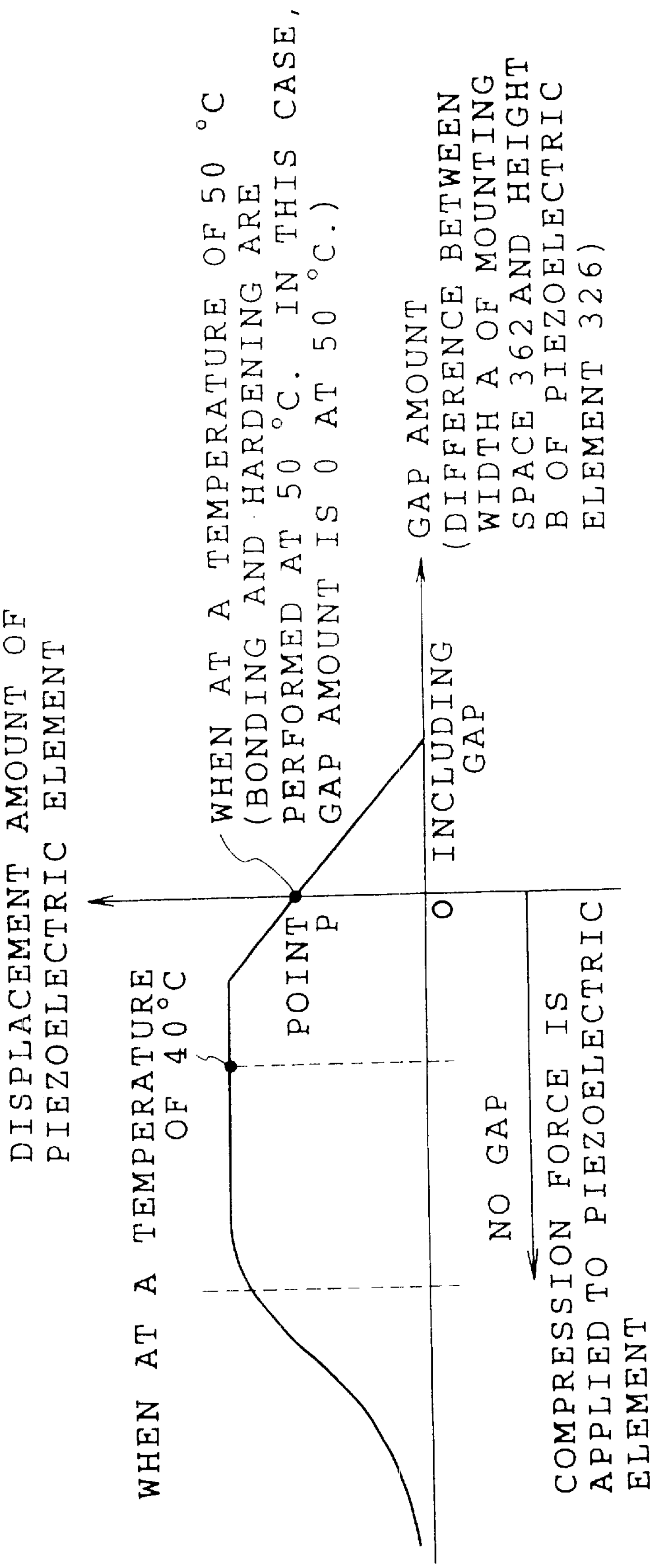
FIG. 16 is a graph which shows a relation between a fitting state and a displacement amount between the frame and the piezoelectric element of the injecting tank in accordance with the third embodiment of the present invention.

Accordingly, when the piezoelectric element 326 is simply bonded to the frame 314 by the adhesive at room temperature, the adhesive is pulled by the difference in the heat expansion coefficient between the injecting tank 312 and the piezoelectric element 326 at the time of controlling the temperature so that gaps are generated, thereby risking a deterioration in bonding. However, as shown in FIG. 16, since the piezoelectric element 326 is bonded at 50° C., a higher temperature than the temperature to be controlled (refer to a point P in FIG. 16), the adhesive is always in a compressed state (a state present in an area having no gap disposed on the left side of a graph shown in FIG. 16) even when being controlled at a temperature of 40° C.

Due to the bonding method of the piezoelectric element mentioned above, even if the height size of the piezoelectric elements are inconsistent, a constant compression force corresponding to a difference of the temperature can be applied to each of the piezoelectric elements when actually used, so that the displacement amount transmitting to the nozzle plate 322 from the piezoelectric element 326 can always be kept constant.

Further, at the time of injecting the water while atomizing, voltage is applied to the piezoelectric element 326 by an electric communication from the power source controlled by the controller so as to deform all the piezoelectric elements 326 in such a manner as to be extended at the same time.

As a result, in the same manner as that of the first embodiment, a plurality of piezoelectric elements 326 are compressed in such a manner as to extend at the same time, so that the portion of the nozzle plate 322 disposed in the periphery of the nozzle hole 324 positioned with being held between a pair of lever plates 320 is oscillated along a direction directing to the light-sensitive material 16 on the transfer path E (in this case, moving to an arrow B in FIG. 14) and the nozzle plate 322 pressurizes the water within the injecting tank 312.

Figure 14:
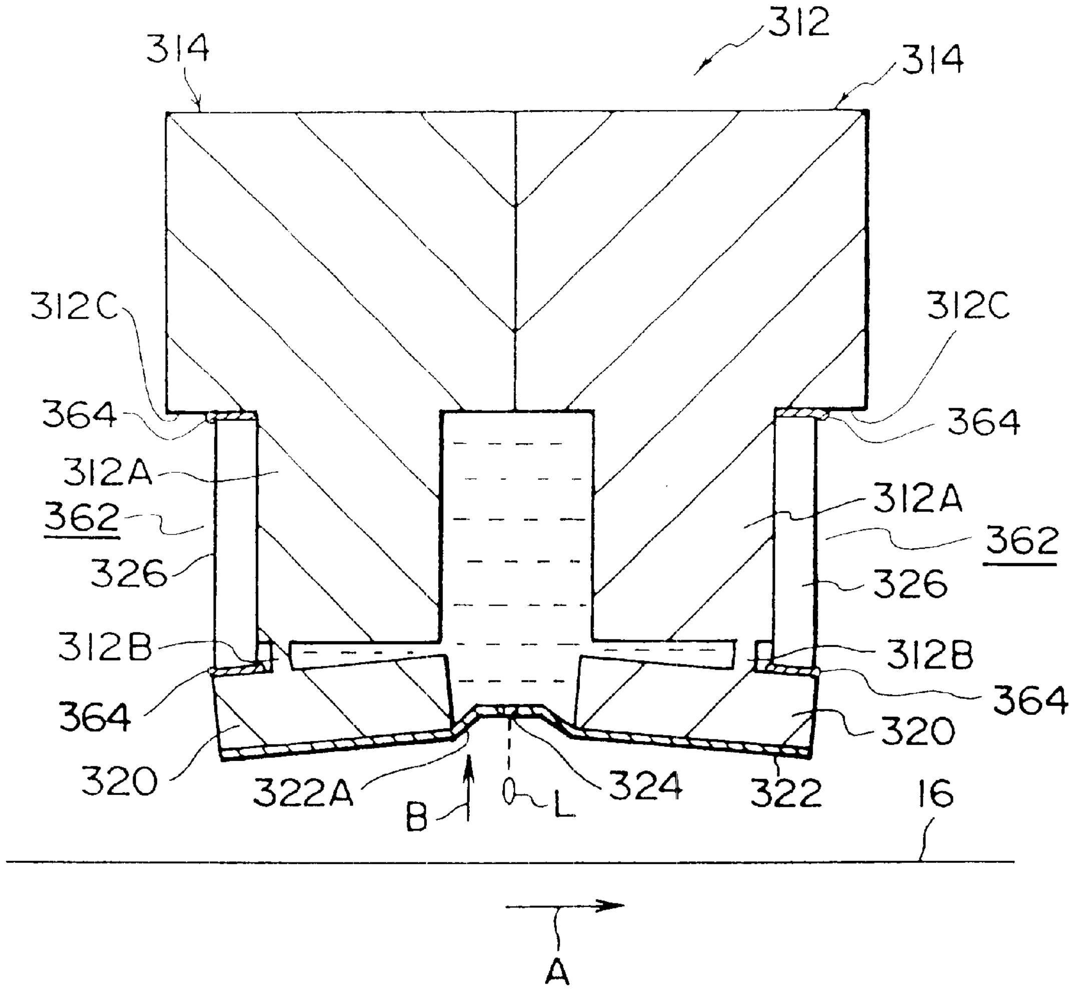
FIG. 14 is a cross sectional view showing a state in which water is injected from the injecting tank in accordance with the third embodiment of the present invention.

Accordingly, together with the motion of the piezoelectric element 326, as shown in FIG. 14, the water filled within the injecting tank 312 is injected from a plurality of nozzle holes 324 so as to be attached on the light-sensitive material 16 during being transmitted.

Figure 17:
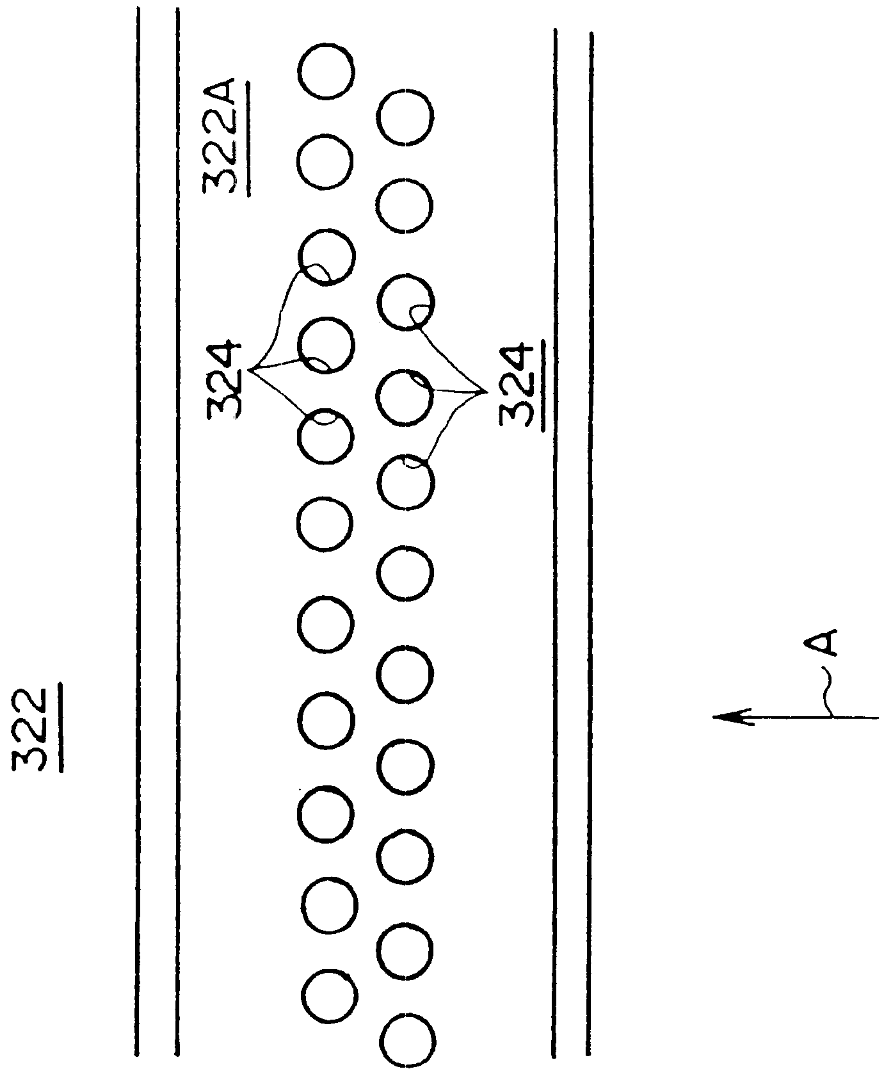
FIG. 17 is an enlarged schematic view which shows the main portion of a disposition of nozzle holes in an injecting tank in accordance with a fourth embodiment of the present invention.

Next, an enlarged view of the nozzle plate 322 of the injecting tank 312 in accordance with a fourth embodiment of the present invention is shown in FIG. 17 and an explanation thereof will be given below. In this case, the same reference numerals are attached to the same elements as those in the first embodiment, and explanation thereof will be omitted.

As shown in FIG. 17, the plurality of nozzle holes 324 injecting the water are disposed in the nozzle plate 322 of the injecting tank 312 in accordance with the present embodiment so that two rows of nozzles linearly disposed along the direction crossing the transfer direction A of the light-sensitive material 16 at a constant interval are disposed in a zigzag manner.

Since the nozzle holes 324 are disposed in the above manner, not only are the same functions and effects as those of the first embodiment obtained. The application for two rows can also be performed with a single injection, so that the number of times the piezoelectric elements 326 are stretched and compressed can be reduced and efficient application can be achieved.

In the above first to fourth embodiments, the frame 314 and the spacer members 350 and 351 are made of aluminum. However, they may be made of other metal materials such as brass, magnesium and the like. Further, the elastic members 354 and 356 are not limited to the material shown in the embodiment. Other materials having elasticity, for example, rubber materials and the like may be employed.

On the other hand, in the above first to fourth embodiments, the nozzle row is set as a single row or two rows. However, the nozzle row is not limited to just a single row or a double row. Three or more rows may be employed. By increasing the number of nozzle rows, the driving number of the actuator can be further reduced.

Further, in the above first to fourth embodiments, the nozzle row is disposed at a right angle to the transfer direction. However, it is not limited to a right angle. The nozzle row may be disposed diagonally with respect to the transfer direction.

Then, in the above third embodiment, the adhesive is respectively charged into the gap between the step portion 312C and the piezoelectric element 326 and the gap between the lever plate 320 and the piezoelectric element 326 so as to bond them. However, only the gap between the lever plate 320 and the piezoelectric element 326 may be bonded by the adhesive.

Further, in the above third embodiment, the temperature at the time of controlling the temperature is set to be 40° C.

and the temperature at the time of bonding is set to be 50° C. However, the temperatures are not limited to these and other temperatures can be employed. The heater for controlling the temperature may be disposed where it is capable of heating water than water of the injecting tank 312. It may be disposed somewhere other than the injecting tank 312.

Still further, in the above embodiments, it is structured such that the light-sensitive material 16 and the image receiving material 108 are used for the image recording material and water is applied to the developed light-sensitive material 16 by the injecting tank 312 of the application apparatus 310, so that the light-sensitive material 16 and the image receiving material 108 are overlapped and thermally developed and transferred. However, the structure is not limited to this, and water may be injected and applied to the image receiving material 108.

Furthermore, the material is not limited to these, and other sheet or roll image recording materials may be suitably used. Materials other than water may be used as the image forming solvent. Moreover, the invention may be used in the application of developing fluid to printing paper in a developing machine, in the application of soaking water of a printer, and in coating machines and the like.

As mentioned above, the fluid injecting apparatus and the method of manufacturing the fluid injecting apparatus in accordance with the present invention has an excellent effect of uniformly applying the image forming solvent onto the image recording material.

Further, even when the size of the actuator is inconsistent, the actuator is bonded and fixed to the injecting tank in such a manner that a constant compression force is always applied to the actuator, so that the displacement amount transmitted to the nozzle plate from the actuator in a state of actually using the fluid injecting apparatus can be made constant. Accordingly, stable fluid application can be realized which gives excellents effects.

What is claimed is:

1. A method of manufacturing a fluid injecting apparatus in which an actuator oscillates a nozzle plate disposed in an injecting tank for storing a heated image forming solvent so as to inject an image forming solvent from a plurality of nozzle holes disposed in the nozzle plate, said method comprising:

a step of disposing the actuator, which is formed to be smaller than a mounting space formed in the injecting tank, in a recessed manner within the mounting space;

a step of next charging an adhesive into a gap between the injecting tank and the actuator which are in a state of being heated to a temperature higher than a temperature of the heated image forming solvent; and a step of hardening the adhesive in a heated state.

2. A method of manufacturing a fluid injecting apparatus according to claim 1, wherein during the step of charging the adhesive into the gap between the injecting tank and the actuator, the adhesive comprises an epoxy resin adhesive.

3. A method of manufacturing a fluid injecting apparatus according to claim 1, wherein during the step of disposing the actuator within the mounting space, the actuator comprises a piezoelectric element.

* * * * *